(12) United States Patent
Cook

(10) Patent No.: US 7,523,892 B2
(45) Date of Patent: Apr. 28, 2009

(54) CENTRIPETAL REFLEX METHOD OF SPACE LAUNCH

(75) Inventor: Michael Leon Cook, 1005 Crest Pl., Kent, WA (US) 98031

(73) Assignee: Michael Leon Cook, Kent, WA (US)

( * ) Notice: Subject to any disclaimer, the term of this patent is extended or adjusted under 35 U.S.C. 154(b) by 809 days.

(21) Appl. No.: 11/084,780

(22) Filed: Mar. 21, 2005

(65) Prior Publication Data
US 2006/0208136 A1 Sep. 21, 2006

(51) Int. Cl.
*B64G 1/38* (2006.01)
(52) U.S. Cl. .............. 244/171.3; 244/171.4; 244/158.5
(58) Field of Classification Search .............. 244/171.3, 244/171.4, 171.6, 158.5
See application file for complete search history.

(56) References Cited

U.S. PATENT DOCUMENTS

| | | | |
|---|---|---|---|
| 4,802,639 A | 2/1989 | Hardy | |
| 5,188,313 A | 2/1993 | Piasecki | |
| 5,564,648 A * | 10/1996 | Palmer | 244/2 |
| 5,626,310 A | 5/1997 | Kelly | |
| 5,842,666 A | 12/1998 | Gerhardt | |
| 6,029,928 A | 2/2000 | Kelly | |
| 6,068,211 A * | 5/2000 | Toliver et al. | 244/2 |
| 6,119,985 A | 9/2000 | Clapp | |
| 6,193,187 B1 | 2/2001 | Scott | |
| 6,682,022 B2 | 1/2004 | Battisti | |
| 6,707,871 B1 | 3/2004 | Thomson | |
| 6,745,979 B1 | 6/2004 | Chen | |
| 7,131,613 B2 * | 11/2006 | Kelly | 244/171.4 |
| 2006/0032986 A1 * | 2/2006 | Maker et al. | 244/171.6 |

OTHER PUBLICATIONS 1.3.3.1 GSFC-752-SPEC-002.x4 Specification for High-Modulus Graphite Filament Prepreg Material for Space Applications. Washington, District of Columbia.

\* cited by examiner

*Primary Examiner*—John W Eldred

(57) ABSTRACT

A method of launching space vehicles by towing them aloft, then twirling them around a large transport aircraft (40) at the center of a formation (AA) of other tow aircraft (28, 34) and other devices of the invention. A lengthy, semi-rigid tow pipeline (14) serves as a conduit for the transfer of fuels and oxidizers, as the tow cable, and as an energy storage device that reflexes efficiently when it is flexed. The flexing of tow pipeline (14) is caused by a parachute (22) acting in conjunction with all the aircraft making the tighest turn they are capable of doing. Tow aircraft in certain arrays (28) are joined to tow pipeline (14) by sliding trollies (26) that also host canard rotor wings for the aerodynamic support of the main tube (12). The tow trollies (26) aid the sliding tow aircraft arrays (28) in gaining mechanical advantage to accelerate the space vehicle. The space vehicle may also burn its own motors for a longer-than-usual time as it gains in angular velocity because its fuels are replenished by a pipeline that automatically increases the pressure and volume of fuel flow as the angular acceleration increases. The tow pipeline (14) features a micro-hole laminar lift foil (50) on the top surface of the wing and on the bottom. By balancing the vacuum level in the plurality of chamber underneath the plurality of lift foil 50, the pilot or autopilot has an effective way to control the flight characteristics of the tow pipeline (14). In some embodiments the micro-hole laminar lift foil (50) on the top and bottom will made of transparent hollow wire segments or other material so arranged as to pass ambient light through to photo-voltaic cells below that convert sunlight to electrical energy.

6 Claims, 12 Drawing Sheets

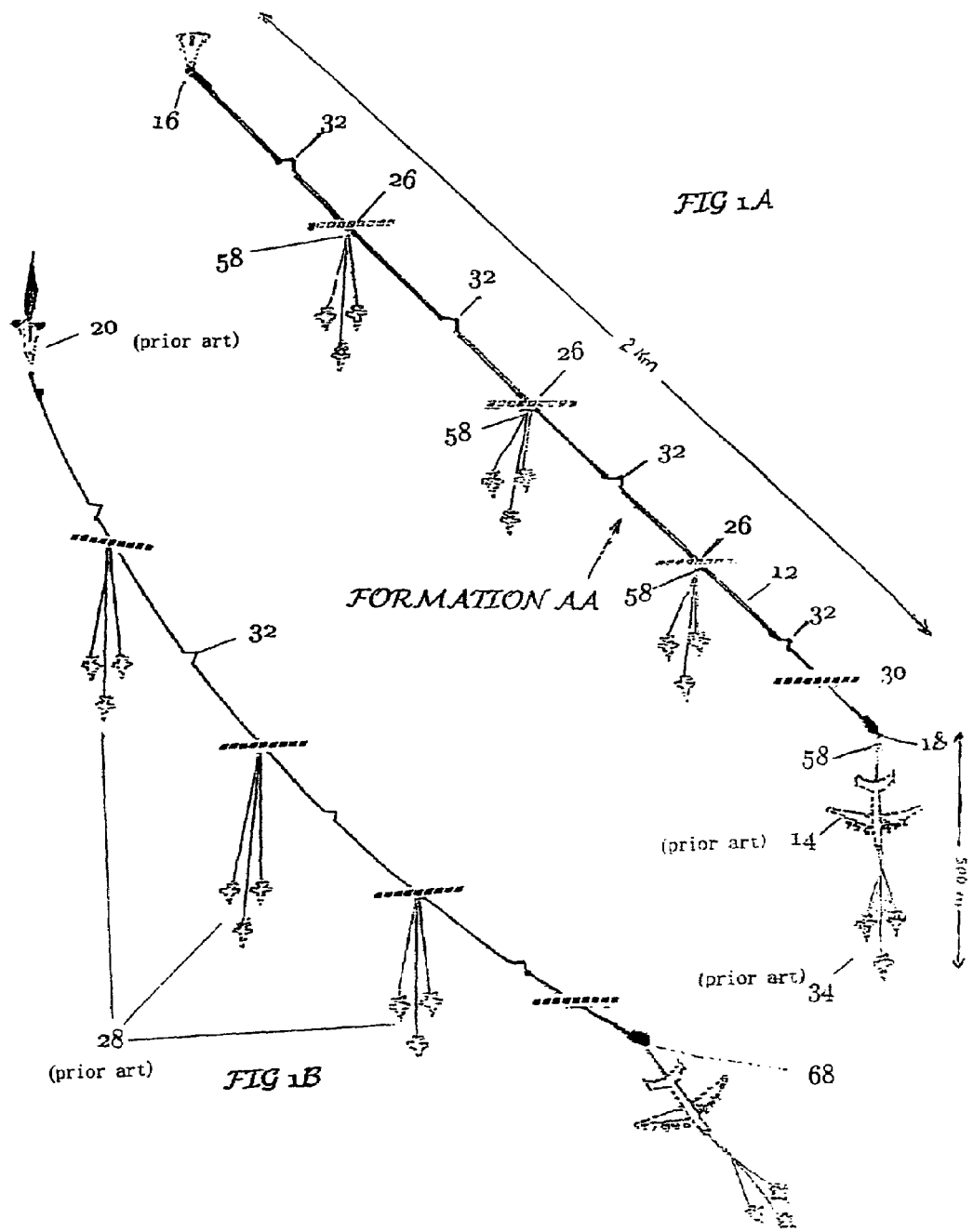

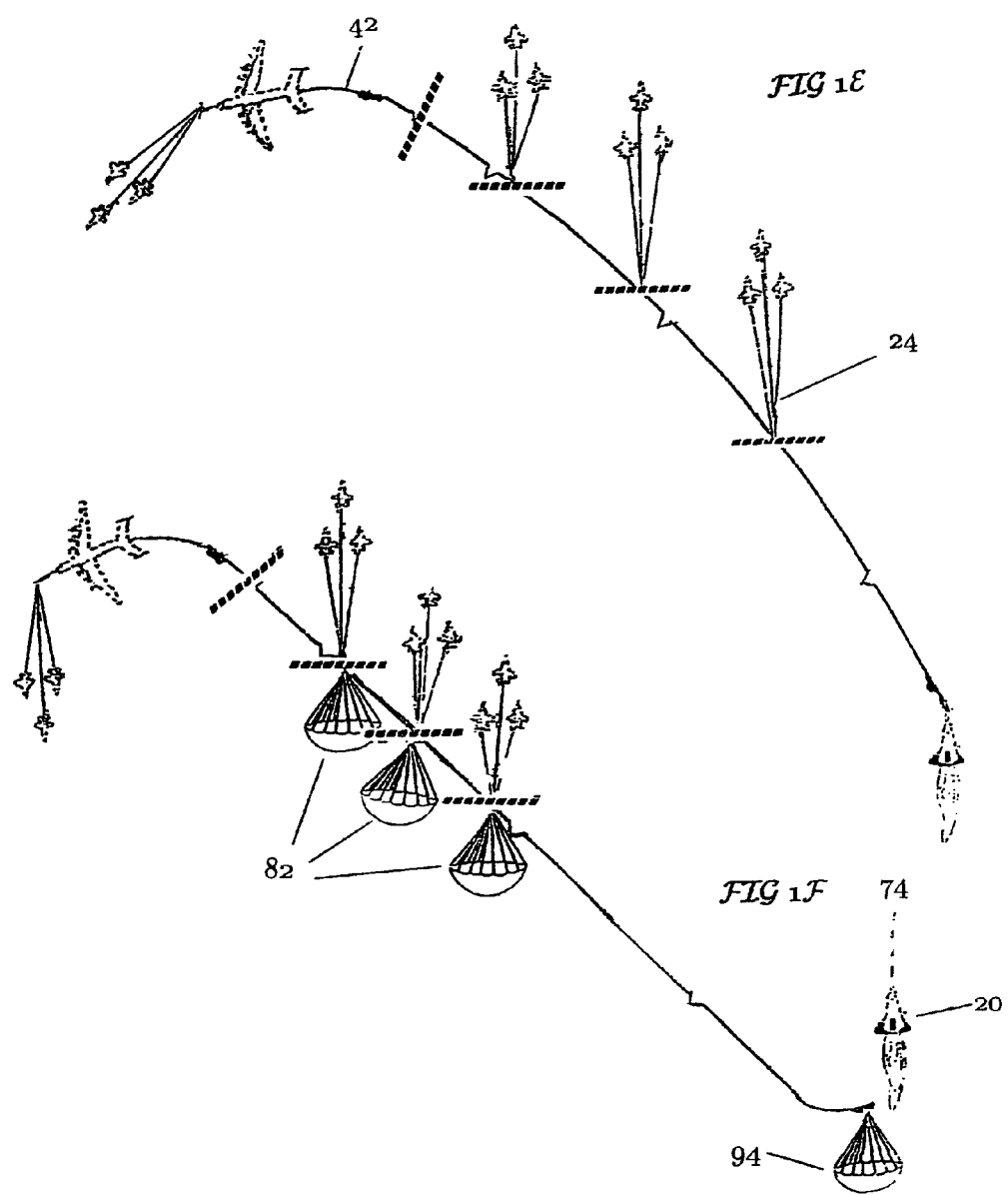

FIG 2B

| LENGTH | MODULUS | DENSITY |
|---|---|---|
| 200 METERS | ZONE 1 50,000,000 | .40 G/CC |
| 300 METERS | ZONE 2 55,000,000 | .35 G/CC |
| 400 METERS | ZONE 3 60,000,000 | .30 G/CC |
| 500 METERS | ZONE 4 65,000,000 | .25 G/CC |
| 600 METERS | ZONE 5 65,000,000 | .20 G/CC |

GRAPHITE COMPOSITE FIBER MATERIAL OF MAIN TUBE 12

FIG 2A The mass distribution zones of formation 11

Zone 1 "Handle end of fly rod"
- Locking pivot yoke 15 — 7,000 kg
- Large transport aircraft 13 — 500,000 kg
- Tow vehicle array 10 — 90,000 kg
- Fixed Rotor Wing 21 — 10,000 kg
- Frame 37 — 100,000 kg
- Piercing Torsion rod 27 — 25,000 kg
- 200 meters of Main Tube 12 circumference 7.2 m. 
- density of composite .4 g/cc — 28,000 kg Total: 770,000 kg

Zone 2
- Sliding canard rotor wing tow trolleys 19 — 12,000 kg
- Sliding Tow Veh. Array 20 — 90,000 kg
- 300 m. of Main Tube 12 — 36,750 kg
- Joint 22c — 1,000 kg Total: 139,750 kg

Zone 3
- Sliding Canard Rotor Wing Trolley 19 — 12,000 kg
- Sliding Tow Veh. Array 20 — 90,000 kg
- Joint 22b — 1,000 kg
- 400 meters of Main Tube 12 — 42,000 kg Total: 145,000 kg

Zone 4
- Sliding Can. Rotor Wing Trolley 19 — 12,000 kg
- Sliding Tow Veh. Array 20 — 90,000 kg
- 500 meters of Main Tube 12 — 43,750 kg
- Joint 22a — 1,000 kg Total: 146,750 kg

Zone 5
- 600 meters of Main Tube 12 — 42,000 kg
- Fixed End Cap 14 — 1,000 kg
- Launch Load 16 — 5,000 kg
- Engines/turbo compressor set — 5,000 kg Total: 53,000 kg

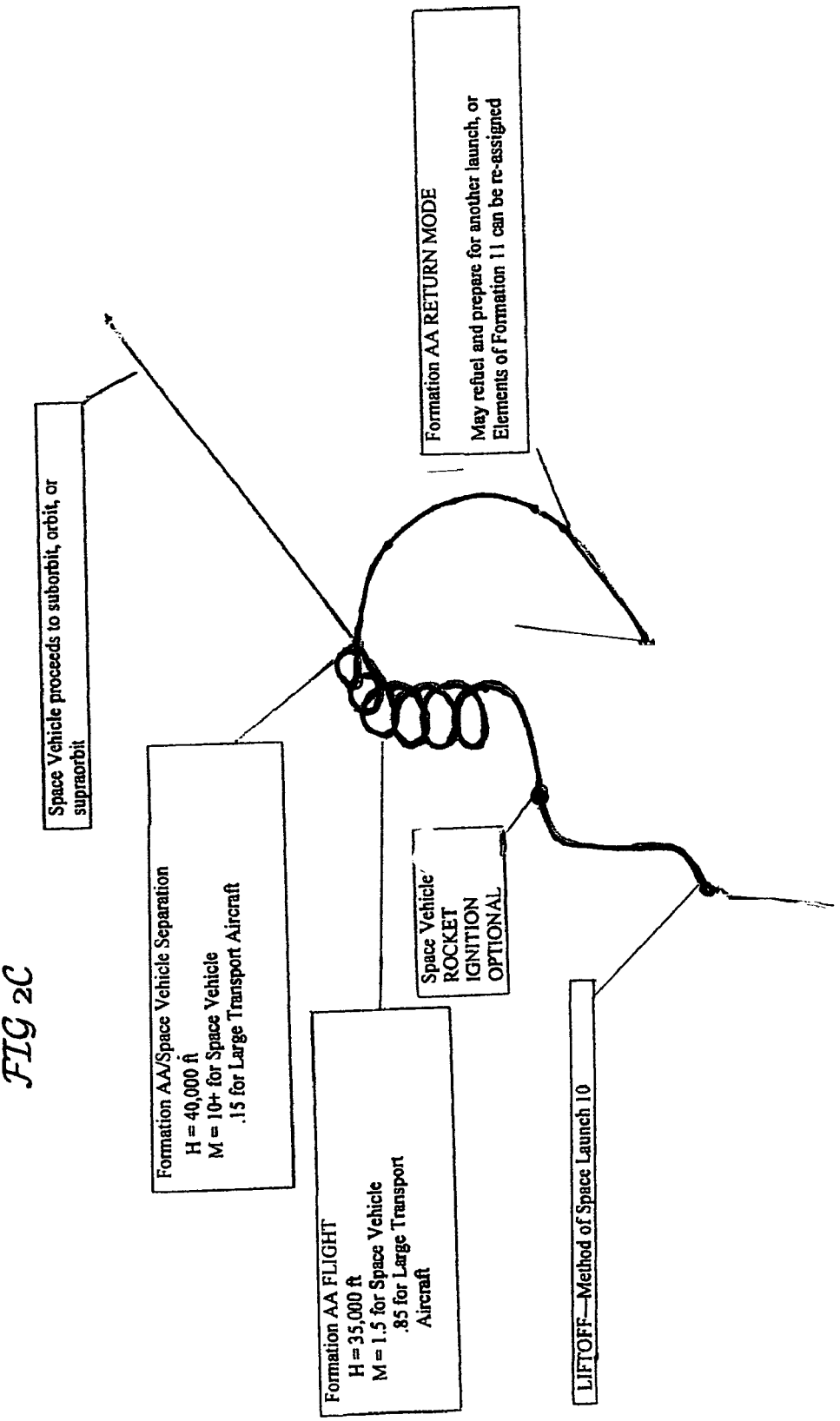

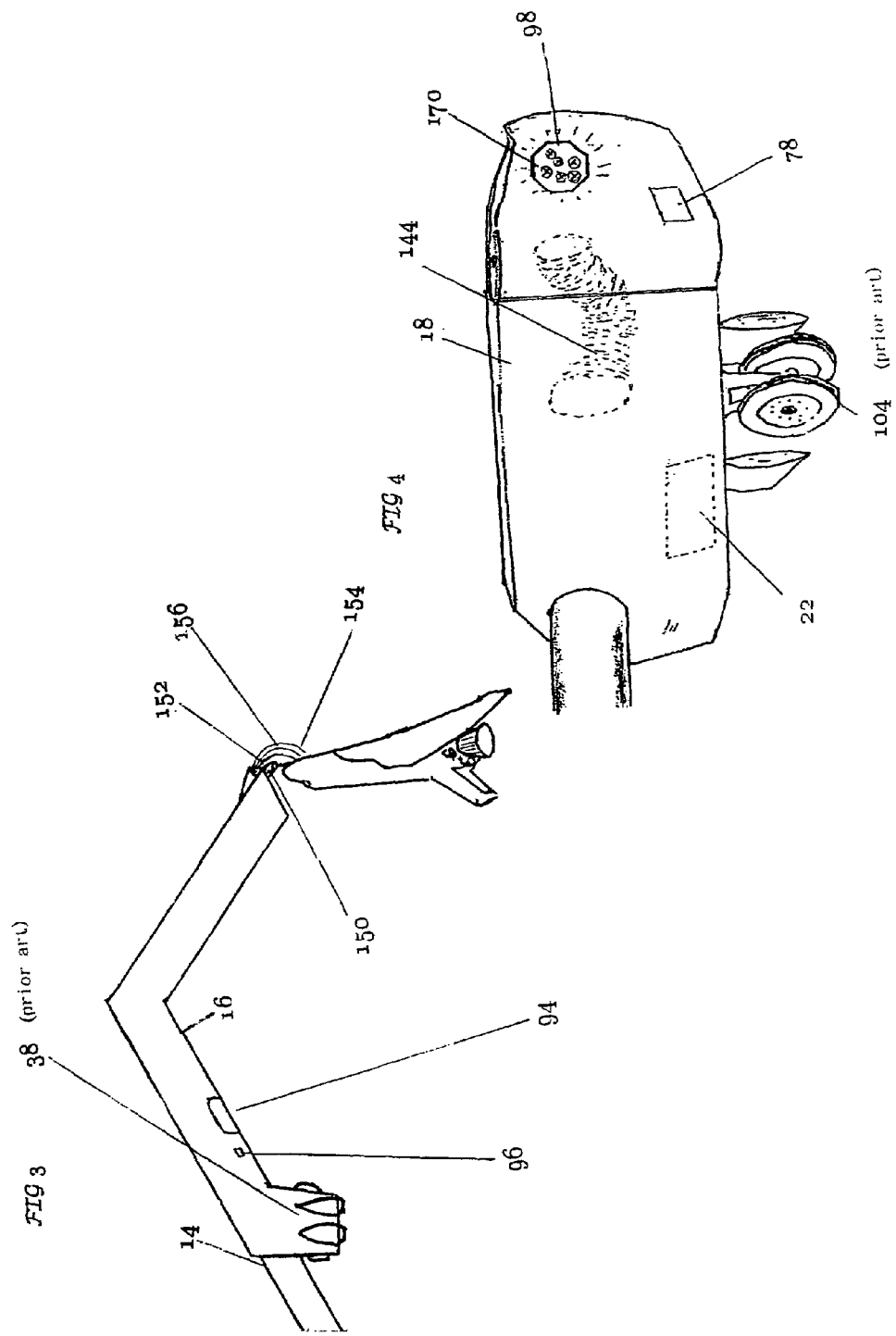

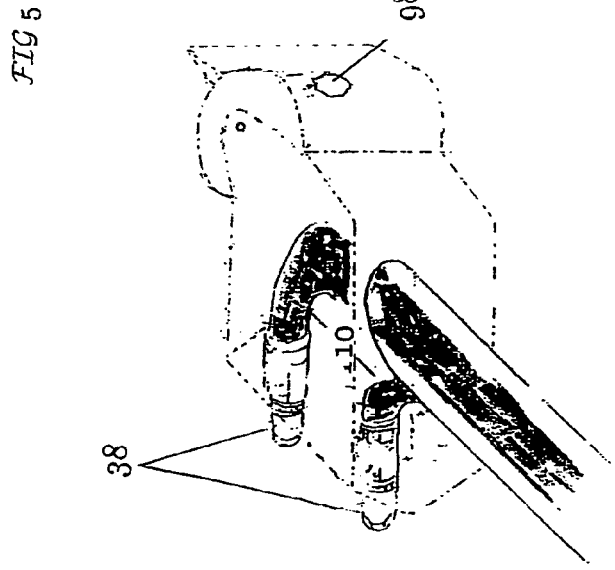

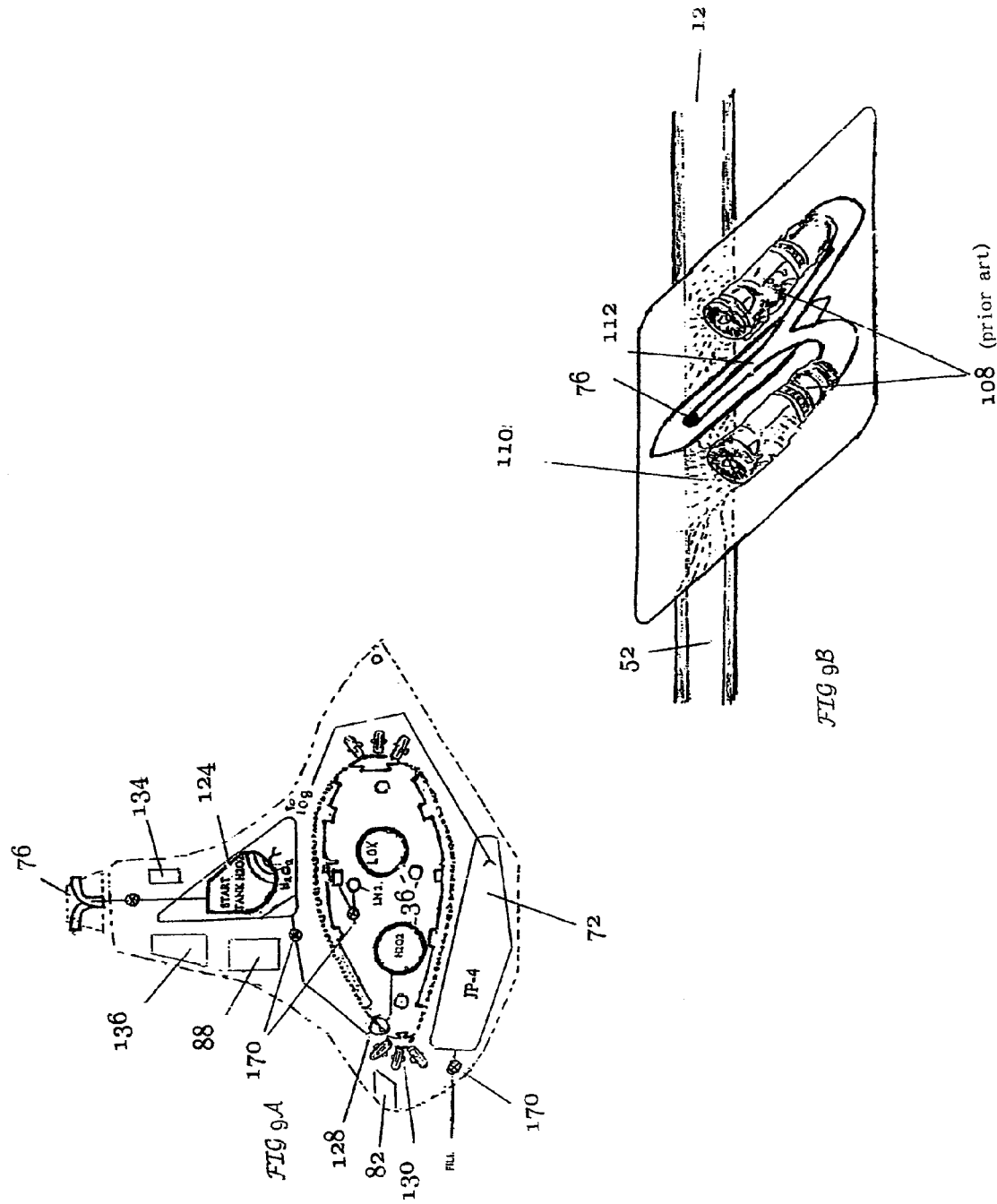

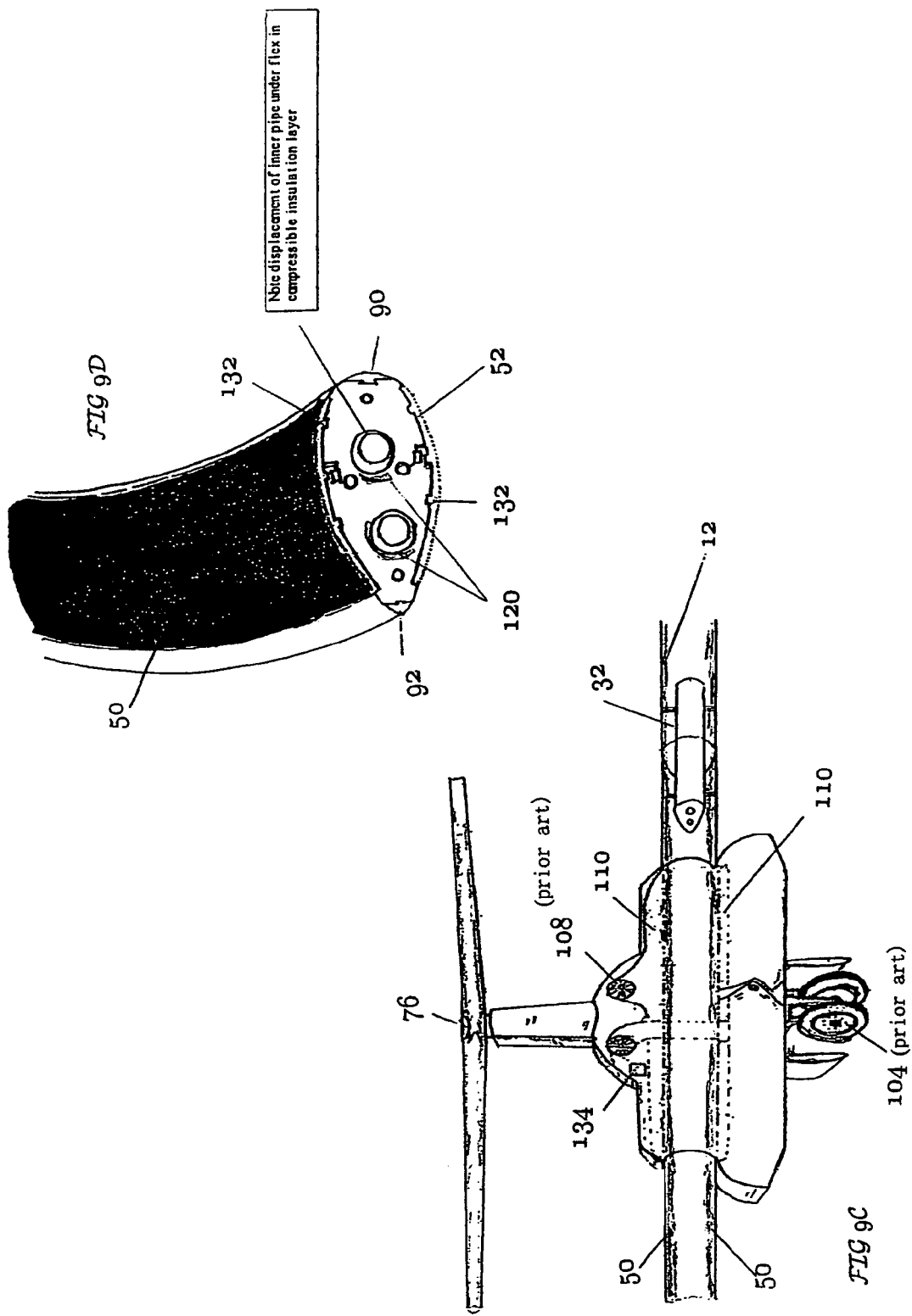

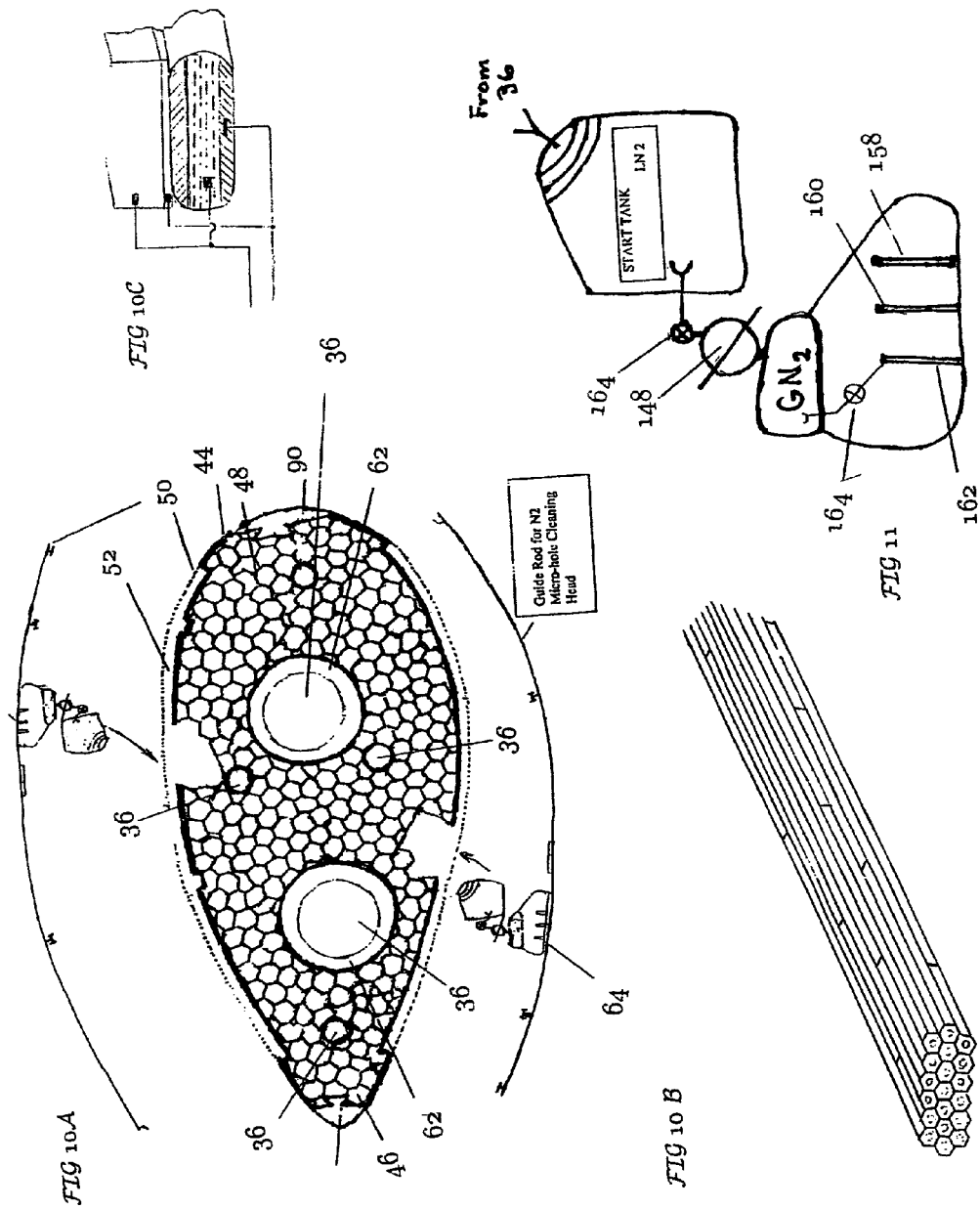

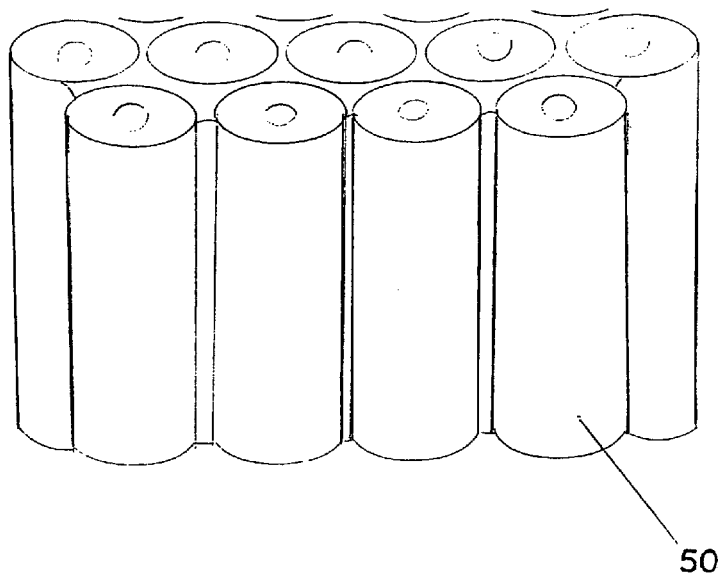
FIG 11B
50
FIG 11C
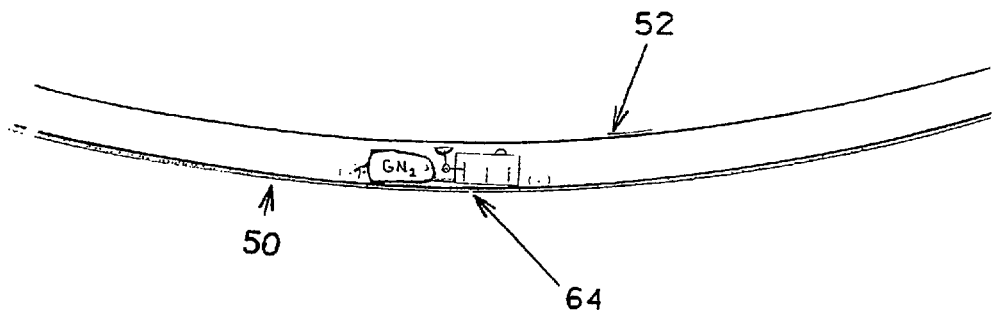
52
50
64

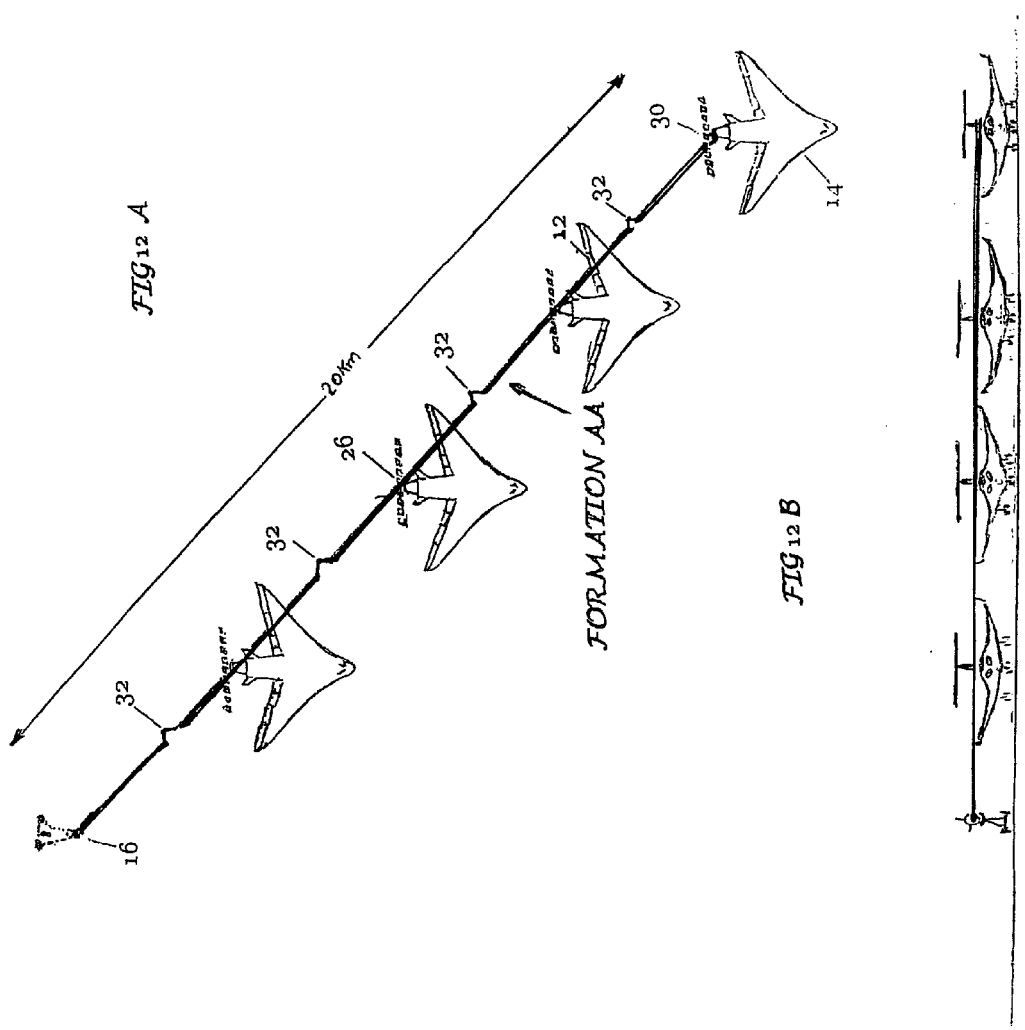

CENTRIPETAL REFLEX METHOD OF SPACE LAUNCH

CROSS-REFERENCE TO RELATED APPLICATIONS

Not Applicable

FEDERALLY SPONSORED RESEARCH

None

SEQUENCE LISTING

None

BACKGROUND OF THE INVENTION

1. Field of Invention

This invention relates to a space launch method whereby a large transport aircraft with the assistance of other apparatus and aircraft tows an intended space load close to the stratosphere and performs specific maneuvers to transfer kinetic energy and a plurality of fuels from a plurality of tow vehicles and structures to the towed load, which will thereafter accelerate by an order of magnitude or more due to the effects of the transfers.

2. Prior Art

Inventors have proposed many methods by which a space vehicle would be propelled out of the Earth's atmosphere. All of the concepts on record in the patent database regarding means of space launch are at least theoretically possible. "Many are called, but few are chosen" is a general adage that particularly applies to the challenge of reaching earth orbit or beyond in a safe, reliable, economical, and operationally flexible fashion. The thrust of the arguments herein will focus on the shoals of practicality, where many previous theoretically acceptable concepts have foundered.

Giuliani, et all. in U.S. Pat. No. 4,709,883 (1987) uses a ground-based magnetic levitation and propulsion system (MAGLEV) to accelerate a launch vehicle in a circular pathway, or a launch vehicle plus a jet-engine tow vehicle. The jet tow vehicle would thereafter do a lot of the work in getting the launch vehicle to an altitude where it would proceed on its way independently. Giuliani proposes another embodiment wherein the circular MAGLEV pathway would be constructed on the moon. This seems like a superior utilization of the concept, but both embodiments suffer from the fact that the optimal launch trajectory would be in one plane. Three degrees of freedom in the launch trajectory could only be achieved by building the circular launch pathway on the equator of the Earth or the moon and then launching at a precise second on the 24-hour rotation cycle of the Earth or the 30-day rotation cycle of the moon, which is highly intolerant of other potential launch delays. Even adjusting the angle of inclination of the launch would be difficult, as the whole horizontal plane of the circular pathway would have to be tilted to avoid having the system look like a bent coin.

Worse yet, it is widely known that all launch systems work best when launching in a due-east direction, so as to take advantage of the earth's spin rate adding directly to the velocity of the launch load. Closer-to-the-equator-is-better is also a prime correlation of this principle. A ground level circular MAGLEV track, or any such fixed track, really then is going to preferentially point at one optimal orbit and anything more than about five degrees from that will be hard to get to. As space gets more congested, such a system obstructs itself after awhile.

Another problem with the ground level MAGLEV track (one that applies to every scheme that accelerates space vehicles to high velocities while still in the thick of the atmosphere) is what to do about heat due to aerodynamic friction and about buffeting due to ordinary turbulence. Any potential space vehicle that is moving much above Mach 1.5 at ground level is going to become pretty warm from aerodynamic heating by the time it exits the atmosphere, plus endure some shaking up.

It is hard to see an advantage of a ground-based MAGLEV approach unless it would be powerful enough to fling unassisted a load at least up to a level where the atmosphere is so thin that scram jets or rockets reign. If considerable assist is needed from air-breathing engines or rockets to reach the stratosphere, the question will always arise about whether the whole job would best be left to such means and skip the MAGLEV complication. To do the complete job without non-magnetic assistance the circular launching ring will probably have to be quite large in order to avoid accelerations beyond what humans can endure.

Moreover, the intended launch vehicle when it exits the MAGLEV ring will still be in the thick of the atmosphere at a very high velocity from ground level up. Hitting a bird or a hail stone at Mach 0.7 is one thing, hitting the same object at Mach 7 is quite another. It is a lot safer situation if a launch system does not generate the extreme velocities until the load is high above much of the atmosphere. As we all saw in the space shuttle Columbia disaster, sometimes the problem is simply something being forced or shaken off one part of the launch load by atmospheric resistance and then it runs into a following part. Airplanes are generally built to be surprisingly flexible because aircraft have to deal with the atmosphere all the time. Spacecraft are often constrained to be extremely rigid, which is why the space shuttles "chatter" so violently during the high velocity climb-out of the atmosphere and why some parts or accretions will always be prone to come loose. Presumably, the Giuliani system would have the space vehicle being launched already at a major portion of its peak velocity and at ground level atmospheric pressure, so the turbulence will probably be much more extreme than the space shuttle (which accelerates vertically more gradually and only goes faster as the atmosphere is thinning) must endure.

Kelly, in U.S. Pat. No. 5,626,310 (1997) and U.S. Pat. No. 6,029,928 (2000) admirably, even exhaustively, describes the advantages of tow vehicles pulling intended space vehicles to altitudes of ten kilometers or greater for launch, thus reducing the need of a powerful first stage rocket booster or other means of boosting the space launch vehicle to high altitudes prior to ignition of the space vehicle's own propulsion system. Kelly also strongly emphasizes the virtues of a space launch vehicle being configured as a winged glider or aircraft so that it may aerodynamically support all of its own weight during takeoff, ascent, and air launch, which in this case would merely be separation from the tow cable at a subsonic speed. Scott, U.S. Pat. No. 6,193,187 (2001) offers a non-tow cargo bay system.

In all of his claims Kelly contemplates that the separation must take place at subsonic speeds. One would think that if being towed to a high altitude is such an advantage for a spacecraft, being towed to a high altitude and released at a speed greater than the speed of sound would be an even greater advantage.

In actuality, Kelly's space launch vehicle is only the first stage of a multi-stage rocket in disguise. It is an admirable first stage in that it does enable the conventional tow aircraft out in front to tug a lot heavier load up to 10 kilometers or so of altitude than the tow aircraft could possibly carry attached anywhere to its fuselage (by a factor of five, according to Kelly.) Kelly documents that advantage very well. Kelly's space vehicle is a laudable first stage in that, after it detaches from the tow and thereafter uses its own rocket motor and fuel to take the actual launch load much higher (about a factor of 8 or to 80 kms), it will coast for awhile above the sensible atmosphere before it opens up and allows the launch load to use its own motor to go on its way. Actually, a nose door opens up and big springs or some other mechanism must push the launch load out and away from the space launch glider, imparting just enough velocity that the launch load will create adequate distance to light its rocket motors without scorching the first stage space launch glider. Kelly's space launch glider would then then be light enough to endure the heat of re-entry without much problem, although it will require shuttle-type heat resistant tiling. Kelly claims that turn-around time on the ground will be quite short and, presumably, the turn-around time for the conventional tanker aircraft would also be short so that two launches a day would not be unfeasible.

It is hard to view either the 1997 Kelly concept or the 2000 follow-on as being suitable for manned flight. In his drawings Kelly puts the launch load basically inside the first stage rocket, between two large liquid fuel tanks (the conventional tow aircraft is considered as being the zero-stage rocket.) Some type of ejection seat pathway would have to be provided to propel the astronauts from inside two vessels in event of mishap during takeoff or the leisurely ascent climb. In actuality, Kelly's space launch glider rather severely limits the size of a launch load to what fits inside its payload bay, as does the Scott system.

None of Kelly's many claims to my knowledge has ever been attempted in an actual space launch, although modeling in wind tunnels, decompression chambers, or elaborate computer simulations may have been done. Neither Kelly nor any references cited by Kelly describe or claim an exchange of significant angular momentum between the tow vehicle and the tow line to the towed vehicle, nor mention any means by which the velocity of the towed vehicle could significantly exceed the velocity of the towing vehicle at the instant of separation and prior to ignition of the space vehicle motor.

Wittmann, et al, U.S. Pat. No. 4,303,214 (1981) Assignee: Hughes Aircraft, describes an apparatus for the gyroscopic ejection of a shuttle launched spacecraft. Particularly, Wittmann concentrates on the problem of launching geostationary satellites from the cargo bay of the U.S. space shuttle in use at that time. Wittmann proposed that the gyroscopic ejection would impart both linear and angular momentum to the satellite at separation from the shuttle, the energy coming partially from a compressed spring in the apparatus and partially from any spin of the space shuttle itself around its own center of gravity. The angular momentum due to spin imparted to the satellite is intended in Wittmann to provide gyroscopic stability to the satellite as it uses its own rocket power to climb to a much higher orbit than the space shuttle could achieve. No cable, tether, or tow line is used in Wittmann's invention for the imparting or transfer of any component of momentum. To Wittmann et all the use of a very slight amount of centripetal force was only a convenient way to get space loads clear of a payload bay, an approach frequently exhibited by inventors in this field such as Kelly, Scott, or Peterson, U.S. Pat. No. 4,646,994, (1987) p. 1.

Piasecki, in U.S. Pat. No. 5,188,313 (1993) describes a towing frame and a computer control system intended to optimize performance of a towing aircraft/towed vehicle pair. Piasecki utilizes a unique towing frame that would intermediate between the tow vehicle and vehicles being towed. Piasecki also discusses the possibility of fuel transfer between towed and towing vehicles, in either direction, but primarily from the towed vehicle forward to the towing vehicle, to increase its range.

It is no disrespect to the inventor to assume that the transparent object of the Piasecki research was to win a defense contract to extend the range and endurance of helicopters. Either conventional helicopters or conventional fixed wing aircraft can greatly extend their range by towing a glider loaded with fuel. The glider would download fuel as needed to the drinking vehicle through a hose associated with the tow line. As Kelly argued in his patent, however, it is better if the vehicle being towed be not only behind, but above the towing vehicle, so as to avoid turbulence created by the towing aircraft. This obviously creates a problem for helicopters. Unless the pilot is paying constant attention, the tow line/hose will get into the helicopter's rotors.

The 1993 Piasecki patent regarding the towing frame appears to have been an attempt to put a device behind the helicopter that could keep the tow/fuel lines clear without needing much monitoring by the pilot. The Piasecki device would probably work, but the defense department apparently decided that the more functional solution would be the Boeing tilt rotor wing Osprey or simply building more efficient, longer-range helicopters. The Piasecki towing frame and fuel-carrying glider would at any rate have been a nightmare paired with a helicopter on the crowded deck of an aircraft carrier.

Nothing in Piasecki refers to winged glider spacecraft or any space vehicle being towed for airborne launch. To my knowledge, no practical, real use of the system Piasecki describes has ever come about, not even in the odd attempt at endurance flying for the record books.

Hardy, et al, U.S. Pat. No. 4,802,639 (1989) Assignee: Boeing, extensively discusses ferry-type space launches in which the intended space vehicle is carried to high altitude by a jet, scram-jet, or rocket-powered aircraft, then released to proceed on its own rocket power. Hardy talks about struts on which the space orbiter will pivot down and away from the aircraft, but no increase in the velocity of the orbiter vehicle due to the pivoting motion itself is mentioned. Hardy envisions separation of the aircraft/orbiter pair at a Mach number of about 3.3. In a second embodiment, the main engine of the orbiter would be a scramjet.

One problem that the Hardy system must overcome is the "bounce" that two objects impose on each other when they separate from such close contact at a high Mach number. It may not be possible to accurately model every possible contingency and variable in that extreme situation. Actual practice can be a hard and expensive way to learn.

Another important concept, found in Clapp, et al. U.S. Pat. No. 6,658,863 (2000) envisions a basically conventional refueling aircraft that internally transports liquid oxygen for transfer in flight to a space vehicle that takes off independently, obviating the need to spend energy transporting this heavy rocket fuel component to launch altitude. Clapp envisions discharging the liquid oxygen oxidizer from the aircraft in which it was transported to the rocket-propelled space orbiter via a conventional trailing-hose refueling arrangement with the use of pumps already developed for moving liquid oxygen and with the assistance of stainless steel bellows, stainless steel braided cable, and/or a gaseous pressurant such as helium Clapp, et al. specifies that its rocketplane/potential space orbiter in the Clapp preferred embodiment would take off from ground level powered by two conventional GE military jet engines. It would then rendezvous with the tanker airplane to fuel up with liquid oxygen or another oxidizer, such as hydrogen peroxide. Clapp suggests a variety of aircraft that could be adopted to the tanker role, including the Boeing 707 or 747, the Lockheed L1011, the Douglas DC-10, existing KC-135 tanker aircraft, and the C-17.

The first major disadvantage of the Clapp scheme is that the Clapp rocketplane will require two separate major fuel systems because it is also a jet plane with two F-16 fighter engines. The rocketplane would fly as a conventional jet to the rendezvous altitude with the tanker, then it will have to mate with that tanker. The normal tendency during typical airborne refueling at the highest allowable altitude is for both aircraft to simultaneously slow and to lose altitude during the procedure unless the "drinking" aircraft increases power significantly, for the reason that the fuel-receiving aircraft is getting heavier and slower as it takes on fuel. The tanker is getting lighter and faster, naturally wanting to ascend unless it backs off on throttle. Therefore either both aircraft are going to tend to slow down and descend a little bit, or both are going to tend to ascend. Maintaining stasis takes effort.

Whatever the drinking aircraft does, it can't avoid wasting a percentage of its total fuel use for the flight, as it either has to surrender speed and altitude it just paid to achieve, or it has to carry extra jet fuel along so that it can keep up with the tanker aircraft as the latter's load lightens and performance improves. What the Clapp rocketplane also probably can't do in this situation is fire up its rocket engine and burn liquid oxygen even as it takes that substance on from the mother ship ahead of it. Even in the unlikely situation that safety concerns are waived and ignition is allowed for a throttleable rocket, the Clapp rocketplane still would have to waste liquid oxygen and other rocket fuel as it loafs along at an inefficient pace for a rocket motor while the delicate fueling process proceeds. Due to the very high purity requirement for most oxidizers, absolutely no fuel tanks, lines, or valves used for jet fuel can be utilized for the volatile, cryogenic oxidizers. Jet fuel can replace kerosene in some rocket engines, however, a plus for the Clapp scheme.

For the Clapp design and all the other prior art ideas intent on exploiting the alluring, positive aspects of tow space launches, there seems to be only lose-lose or at best win-lose outcomes available. But now it is time to show the path to win-win.

OBJECTS AND ADVANTAGES

It will be shown that rocketplane or other space vehicles compatible with the centripetal reflex method of space launch (and there may be a great many existing designs of them that would work) can be efficiently towed all the way to launch altitude without needing air-breathing engines of their own as long as they have a tow or a push point. It will be shown also that the centripetal reflex method of space launch tends to conserve rocket fuel and oxidizer, in favor of expending conventional jet fuel like JP-4. Moreover, it will be shown that there are no surrenders or give-back transitions in the centripetal reflex method of space launch. Everything gained by the expenditure of fuel mass is turned, one way or another, directly into the launch load achieving sub-orbit, orbit, or supraorbit as desired.

Rarely are any of the major systems of the centripetal reflex method of space launch (CRMoSL) found to be at cross-purposes with each other, compromising each other, or even significantly complicating each other. This is a uniquely harmonious design.

The centripetal reflex method of space launch, like the Giuliani et al method, also highlights a circular launching motion, but one that starts above about 50% of the earth's atmosphere and involves no fixed containment track. It (the centripetal reflex method) is one of the spinning tether class of space lift concepts. There actually is no reason that the present centripetal reflex method would not work in the exoatmosphere as well. A plurality of rocket vehicles would have to be used in the vacuum as the tow vehicles instead of aircraft with air-breathing engines, or another embodiment could use all scram-jet tow vehicles at the upper edge of the stratosphere. The latter embodiment might serve for direct launches of one-way loads to Mars without rocket motors going along unnecessarily.

Moreover, the centripetal reflex method of space launch is configured to deal with the obstacles of extreme heating, vibration, and turbulence when high Mach numbers are generated for a space vehicle while still within a substantial portion of the earth's atmosphere. The moment of separation of an intended space vehicle from the centripetal reflex main structure is so configured geometrically that there should be no significant harmonic shock or turbulence interference of either the parent platform or the departing space vehicle with each other as they part company.

The Rutan space launch to win the ANSARI X prize involved a ferrying vehicle, not a tow, which in physics analysis is the same as a ferry launch in which both vehicles separate at very close to the same velocity. All the tow vehicle/towed vehicle space launch concepts heretofore or hereafter discussed as competitors to the centripetal reflex method of (tow) space launch are actually more similar to ferry methods than to the CRMoSL. It is an object of the inventor to demonstrate how profound are the differences, and hence, the advantages, of the centripetal reflex method of space launch and its unique exploitation of the physics of spinning tethers to previous art regarding the towing of space vehicles.

The centripetal reflex method of space launch will also rely on conventional aircraft as both tow vehicles and as supply vehicles for in-flight refueling. The centripetal reflex method of space launch, unlike Clapp, does not waste any of the fuel burned or transferred during the refueling/transfer process itself, for the reason that either a generally smooth increase in linear velocity, or a gain of altitude, or an increasing angular velocity will be achieved throughout the process, even as it proceeds through the transition from the realm where air-breathing engines work most efficiently to the realm where the burning of expensive and exotic rocket fuels can not be avoided. That is quite an astonishing claim. How it is done will be detailed in other sections.

Rutherford et al U.S. Pat. No. 5,454,530 (1995) and Bass, et al, U.S. Pat. No. 6,789,764 (2004) introduce canard rotor wings and provide ample discussion of the benefits and advantages of using such devices to get airborne. The centripetal reflex method of space launch subscribes to this enthusiasm and takes it a bit further, for powered canard rotor wings (CRW) are the perfect devices to get a heavy, awkward load like a semi-rigid fuel transfer tow pipeline that may be several kilometers long or more up in or near the stratosphere. Better yet, CRWs as known to a person skilled in the art shall be able to cope with the complicated shifts of roles they will be called on to perform during the ascent, twirling (spinning), flex, reflex, expulsion, recovery, and return modes. The centrifugal reflex method of space launch does not suggest or require any specific advancements in the prior art of CRWs other than up-sizing.

Powell, et al U.S. Pat. No. 6,311,926 (2001) suggests a space tram for reaching escape velocity from this planet. The magnetically suspended, evacuated sky tube through which a spacecraft would be propelled is competitive with the centripetal reflex method of space launch in the type of economies created by the ability to do several launches a day with the expenditure of few consumable resources beyond conventional commercial energy sources.

Rodriquez, U.S. Pat. No. 4,674,710 (1987) concerns an algorithmic method for coordinating the turns of a large formation of aircraft. This prior art may be important for the realization of the centripetal reflex method of space launch, although it is possible that maximizing the energy transfer to a load during formation turns can be solved by other methods. In any event, the pilot of the tow pipeline will sit in the right-hand seat of the large transport aircraft, so that he has direct view of the pipeline and all other aircraft.

Chen, U.S. Pat. No. 6,745,979 (2004) documents the considerable advantages of spacecraft and aerospace planes having scissors wings. The CRWs as known to a person skilled in the art adopted in the present invention benefit the centripetal reflex method of space launch by their ability to assume changing scissors wing cants in fixed wing mode.

Boyd, et all U.S. Pat. No. 6,491,258 (2002) caused quite a sensation when it was published to the world. The idea that a space elevator could even be possible made for fascinating science news. Visualizing elevator cars whizzing up and down fantastically strong carbon composite cables as fragile-appearing as gossamer threads made us all realize that the $21^{st}$ century is here with a vengeance. In some embodiments the elevator cable is envisioned as a ribbon. The thickest, strongest points of this ribbon will actually have to be at its middle, not at the tips, one of which anchors to the ground and the other to any handy collection of space ballast. Any overlap or comparison with the centripetal reflex method of space launch concerns only the carbon composite materials that benefit both and the type of economy and casual access to outer space that both would bring, once realized. The centripetal reflex method, we will show, is substantially easier to realize.

Gadzinkski, U.S. Pat. No. 6,068,328 (2000) is an example of enhancing laminar flow over airfoils in trans-sonic flight by use of micro-porous arrays and a suction source. To clean the micro-hole perforations and all the manifolds and plenums, Gadzinkski suggests reverse flow through the components, perhaps by induction pressure from the main engine. The centripetal reflex method of space launch utilizes "reverse" flow in a sense that different sets of jet engines will draw ambient air through the micro-holes and associated channels during flight. Each set of engines always draws outside air in the same direction, but they alternate as the sliding CRW tow trolleys move up and down the tow pipeline and no exhaust gas fouls individual micro-holes or other passages of the laminar flow enhancement system. Particulates not dislodged by reverse flow will be attacked by methods using more precision, principally being high pressure nitrogen gas and lasers.

The centripetal reflex method of space launch therefore pulls relatively pure air both ways alternately through the micro-holes a lot, and also relies on precision cleaning by nitrogen gas and low-frequency red lasers to melt ice and drive off moisture continuously during flight. Keeping the micro-holes clean is a major challenge. Gerhardt, U.S. Pat. No. 5,842,666, (1998) assumes laminar flow suction strip devices will work and draws a nice reverse-delta wing supersonic transport aircraft to take advantage of that fact. They do work, if clean.

The centripetal reflex method of space launch otherwise scantly relies on leading edge technology. Almost every element of it can be built with off-the-shelf late $20^{th}$ century technology and relying on sturdily dependable $18^{th}$ century physics. The method may fairly be categorized as belonging to the spinning tether class of space transport methods, only with significant and unobvious enhancements that allow the method to perform well in the presence of the atmosphere several kilometers or more above the surface of the earth.

The chief of these enhancements will be the tether, which will not only be a relatively rigid structure made of carbon composite fiber materials, but will also double as a major fuel pipeline. Fuel pipelines longer than a kilometer, or as long as several tens of kilometers, have the advantage of becoming significant storage vessels in and of themselves, provided that the internal diameter of their actual fuel channels is not insignificant. If the lengthy, relatively rigid, tow pipeline should also have the advantage of a relatively aerodynamic shape and there being a means provided to spin it compactly in mid-air, then the centripetal reflex method of space launch does have an advantage over other concepts in the class of spinning tether space transporters. In fact, the centripetal reflex method of space launch possesses all the necessary means and attributes necessary to achieve such advantage, and other advantages.

Such advantages will be found in the realms of force multipliers aiding the acceleration of a launch load, of best use of prior art regarding multi-aircraft towing techniques, best use of prior art concerning transfer of fuels and oxidizer to allow longer rocket burn, the provision of means known to a person skilled in the art for concentrating cryogenic liquid oxygen and liquid nitrogen using energy from solar or nuclear (or both) power in the large transport aircraft, and best use of the most properties of the liquified cryogenic gases once prior art industry extracts them from air in or near the stratosphere aboard a large transport aircraft.

The centripetal reflex method of space launch may be conceptualized as similar (but not quite the same) as the physics analysis of snapping a whip made of braided leather. In general whip-snapping, the hand of the person holding the handle may twirl the leather whip up to a desired velocity, then the hand abruptly moves forward in the direction of the intended termination path at a velocity usually greater than 40 m.p.h. The propelling hand dips at the end of its motion and comes to a near standstill. The energy supplied to the tip comes from the momentum of the upper human body, the arm, the hand, the whip handle, the tapered, semi-rigid body of the whip itself, and the smallest mass of all, the tip, which we will hereafter call the load.

The whip responds to the final motion in a serpentine fashion due to the angular momentum arising from the mass of the hand and the tapered whip's own mass forcing an incremental transfer of kinetic energy down the length of the whip to the tiny tip.

Because the mass of the tip is much less than either the propelling arm or the mass of the whip itself, the velocity of the tip accelerates to greater than the speed of sound in order to conserve angular momentum. The small pop typically heard is the tip exceeding the speed of sound, a tiny sonic boom. An acceleration of more than an order of magnitude has been achieved comparing the initial speed of the arm and hand to the final supersonic speed of the tip. The aim of the CRMoSL is to achieve at least an acceleration of an order of magnitude of space launch loads, probably significantly greater than one order of magnitude because of subtle ways we have tweaked this concept and blended in other speed boosters. A fly rod is quite a lot stiffer than a leather whip (at least in its thicker portions) and fly rods are tasked to throw out a heavier, bulkier load at the business end. Fly rods rely not only on conservation of angular momentum that begins in a human shoulder and arm, but also on the tendency of some stiff materials to reflex efficiently when released from being flexed. Flexing will be initiated by using large parachutes to set the pivot, which will accomplish a profound and final acceleration of spin of the tow pipeline, anchored on one end and swinging on the other, to transfer energy.

To apply the whip snapping principle to a space launch on a much larger scale, we must account for one important difference. In the instance of a space launch, the load end of the whip action (in this case, a rocketplane winged glider spacecraft) will have some slight mass versus the considerable mass of all the elements of the centripetal reflex method of space launch considered in toto. The physics does rather resemble fly fishing.

One of the advantages of a tow launch using conventional aircraft for the tow vehicles is that the whole, combined system can fly hundreds of miles to an optimal launch point, a procedure sometimes necessary for precise insertion into polar or other difficult trajectories without waiting weeks for nature itself to produce favorable alignments. Another major advantage is that the mission can be terminated when the space load is above 60% or more of the Earth's atmosphere, yet the space load can still be towed back to base. Other launch systems reach their point of no return much sooner and lower in altitude.

In fact, the centripetal method of space launch should be sufficiently forgiving that the space vehicle could be at Mach 1.5 when the launch is aborted, thereafter being towed home. All the liquid oxygen would be dumped, as benign a pollutant as can be imagined.

All in all, there are ten conventional jet engines integral to the tow pipeline in the preferred embodiment and up to thirty more in the various tow vehicles. All of these engines may have conventional afterburners (reheaters) and some of those may be augmented by liquid oxygen or hydrogen peroxide boosts, a prior art procedure that also reduces emissions as well as significantly increasing power through burning jet fuel more completely.

It is the natural and beneficial tendency of the centripetal reflex method of space launch to deliver all fuels or cryogenic liquid in the tow pipeline with greater pressure and volume as the spin rate of the tow pipeline increases. All of this flow is automatically going to work to cool the fast end of the tow pipeline. A major design goal will be to consume all of the flow supply en route by the instant that the launch load separates and departs.

The total efficiency of this system could be improved yet further if the weight of the energy source that will be required for the industry of manufacturing liquid oxygen and liquid nitrogen from the atmosphere in flight could be reduced. The preferred methods of supplying energy to concentrate oxygen in flight is by means of a large amount of solar cell electricity supplemented by a small gas turbine generator to stabilize the supply. The tow pipeline is basically a very long wing with about 4,000 square meters of surface area available on its upper surface and 4,000 more on the bottom. An additional embodiment describes a method (see claims) for mating micro-porous laminar lift enhancement to a surface that converts solar photons to electrical power that will be described. Basically, this method constructs micro-porous aerodynamic foil out of short (1 to 100 mm) sections of fiberoptic tubes that are latitudinally glued together. Such a foil passes photons and air molecules through the same holes of 3 to 60 microns. The photons later encounter photo-voltaic cells on the floor of the laminar flow suction manifold ducting.

It may seem counter-intuitive to put a laminar flow suction strip on the bottom of an airfoil, not to mention photo-voltaic cells, but the tow pipeline is a special purpose device that is not going to follow all of the rules. First of all, it is isometric around the horizontal axis. It will derive aerodynamic lift not through a difference in shape between its top and its bottom, because there is none. It will derive lift from the differential between the boundary flow around the rain-drop shape being made faster or slower on top or bottom by adjustments to the laminar flow system that the pilot makes.

The advantage of this radical system is that the pilot can make the tow pipeline go up or down without causing any twist to the very long airfoil. Conventional effectors tend to twist wings, an effect not noticed on typically short, normal high-speed wings, but one that will be very noticeable on the two-kilometer or more tow pipeline. Also, the laminar flow suction system is intended to ventilate and cool the tow pipeline sections which reach high Mach numbers, something 4,000 square meters of micro-porous surface will do better than 2,000 square meters. Additionally, manufacturing is kept simpler by having the top and bottom laminar flow systems be identical in every respect. They are not mirror images, which would take more left-or-right handed parts, but identical, which means the system is not truly isometric. The tow pipeline is not designed primarily for lift, but extreme speed.

Racking up more advantage, most of the time that the oxygen concentrators in the main transport aircraft are hard at work they will be high above most clouds, so the lower wing solar collectors do receive a significant amount of reflected light from both clouds or the surface of the Earth, just not as much as the top of the wing. Moreover, immediately underneath each photo-voltaic cell in the end sections of the tow pipeline and sharing the same electrical production gathering wires is a different type of electricity-generating cell—a thermocouple. The heat generated by aerodynamic friction is going to be harvested to help produce a last surge of liquid oxygen. Note that the different methods of cooling can be compartmentalized so that interference with each other can be minimized. Indeed, the thermocouples will be incorporated to the bottom of the solar cells as cooling elements. Sharing a common collection grid for the harvested electricity from individual cells of different types is a fairly significant advantage.

It will be understood that much of the liquid oxygen produced, then, will be made in a hurry, and it will be consumed in a hurry due to the inherent tendency of the centripetal reflex system to deliver fuel more quickly the faster it spins. Actually, such haste is a good thing from the standpoint of efficiency. Stored fuel mass represents a dead load that takes energy to support aloft aerodynically. Make it quickly, burn it quickly, is a good rule. If it should not be all consumed by the instant that the launch load departs, that is not a totally unuseful thing, for the tow pipeline will still need to be cooled down and all the TVC-equipped engines should have a reverse-thrust option which can help the parachutes control whiplash. Any leftover fuel will propel the tow pipeline back to a balanced landing.

The first parachute set to deploy, the one that sets the pivot around which the tow pipeline and its tow vehicle arrays will "whip snap", has to be just the right size. Too small and the system will not accelerate angularly to the maximum potential. Too large and the tow pipeline may break under tension. Strain gauges will monitor the tow pipeline in real time.

Because there are multiple parachutes in the set, an amount of adjustment is possible by releasing one. Another possibility is some of the parachutes having controlled panels that will dump air on command, a system known to a person skilled in the art. The computer program to control this may well be similar to systems developed that allow mile-long railroad freight trains to accelerate under steady power without jolting too hard and overloading a particular coupling between rail cars, even going over humps or through valleys or on a tight (for a train) curve.

An alternate embodiment to solar power would utilize airborne nuclear power. A patent filed in 1962 roared back to life on Mar. 16, 2004. That day Thomson was granted U.S. Pat. No. 6,707,871 for a nuclear reactor suitable for an airplane. Another alternate candidate to supply a lot of electricity if solar power proves inadequate is a quantum nucleonic reactor that is being developed using hafnium fuel to drive a triggered isomer reaction.

The pilot of the tow pipeline was mentioned briefly in passing. The tow pipeline has no moveable control surfaces except what may come with the CRW's. It does have a plurality of GE F100 series jet engines (F-16 fighter type) some of which will have thrust vectored control (TVC.) This is basically how, in combination with flying the laminar flow system, the tow pipeline pilot will control her huge aerodynamic creature. She should be a good pilot. The best stick-and-throttle airplane jockeys in the world at the moment are probably flying AV-8 Harrier jump jets, which are very quickly crashed by inept pilots. In many respects, the tow pipeline is just one big jump jet, which is why it can turn so sharply.

In the late 1990's powerful fan jet engines of up to 120,000 foot-pounds of thrust each became available. Four of these should be sufficient to take a million-pound gross takeoff weight aircraft of the alternative embodiment to 35,000 feet or higher. An ideal large tow vehicle envisioned for purposes of realizing the CRMoSL in the ultimate alternative embodiment should have abundant wing area for its weight and a power-to-weight ratio of nearly 1:2 or better, with reheaters and thrust vectored control fitted to the commercial air breathing jet engines (both of these features being known to persons skilled in the art.) The purpose of all the excess power is to allow for maximum lateral acceleration at high altitude using diverted thrust from the four or more engines.

The centripetal reflex approach may seem to involve a profligate investment in equipment (a large transport aircraft, a plurality of smaller tow vehicles, and a uniquely long flying tow pipeline supported by CRW's) to replace the first stage of a rocket, or a special ferry aircraft, or a balloon, all of which might actually carry the space load a few miles higher in the stratosphere for launch. Some experts might argue that the conceptual simplicity of single stage to orbit or conventional multi-stage rockets equates to economy, or that this present centripetal reflex launch method would burn up ten pounds of jet fuel to save one pound of rocket fuel. The reality is that jet engines can operate tens of thousands of hours before needing rebuild, but rocket motors even when recoverable wear out much more quickly. Rocket fuel (unless it is kerosene) often costs a hundred times or more its energy equivalent in JP4 jet fuel. Speaking strongly to the unobvious economic advantage of this invention is the fact that the tow vehicle formation and its crews, when assembled, should be able to stage two or three launches a day for weeks, or to come together on short notice in nearly any corner of the world to undertake a series of launches.

Moreover, even the huge, strongly-built, over-powered and under wing-loaded American large transport aircraft prayed for in the ideal alternative embodiment might not have to be dedicated to a space launch role alone. It may be able to do two or three space launches a day (tows attach very quickly on the ground) and still serve as an ordinary heavy cargo transport at night. Its costly, special purpose features such as the diverted thrust engines, extended tail boom, and special over-large control surfaces will not disqualify the large transport craft from other utilitarian purposes (the cargo floor frame and its externally protuberant attachment points should be easily removable.) These same features will accord well with STOL performance, or with flying surface effect, or with operations as a seaplane with the extended tail boom doubling as a long, ground vehicle loading ramp for amphibious operations.

The centripetal reflex method of space launch proper, however, is a method and as such does not depend upon the development of a single type of large tow vehicle. The principles of this invention would work almost as well if a series of existing aircraft were linked in series along tow pipeline 14, so as to approximate a massive but flexible whip. The aircraft at the pivot end of the line (the opposite end from the load) will use high volume, remotely steerable drogue parachutes to create the pivot. Aircraft stationed closer to the space craft end of the line will be lighter in weight and progressively moving faster, even hypersonically, during the "twirling" portion of the launch maneuver. It is anticipated that the tow pipeline's whiplash mode during recoil will necessitate component aircraft of the tow vehicle arrays to temporarily detach from the tow pipeline. Most will rejoin later, means being provided to do so.

The method shown in the preferred embodiment features a dozen small aircraft pulling the tow pipeline. Another embodiment might have some or all of this twelve pushing the aircraft. Similarly, a plurality of existing aircraft could be yoked in parallel and attached to the tow pipeline or to a plurality of additional tow lines that replace or supplement the backbone tow pipeline. Whether linked in series or parallel, in front towing or behind pushing the tow pipeline, the plurality of smaller tow vehicles should possess a lot of power for their size and robust internal framework to maximize the "g" forces they can endure. A variety of suitable military aircraft will be suggested in the following section.

BACKGROUND AND SUMMARY OF THE INVENTION (supplemental)

The present invention possesses functionality similar to a patent by Maker, et al, 2003, in that both inventions will effectively supply fuel on demand to at least one engine according to an operational condition of the engine. The present invention in the entirety of all its devices effectively becomes a kind of pump which automatically supplies engine fuel according to the power demands of an operating engine. In addition, the present invention may or may not well benefit from the application of specific technologies developed in accordance with said Maker, et al invention.

The present invention possesses functionality similar to a patent by Kelly, 2006, inso far as both inventions contemplate raising the intended space vehicle launch load in a horizontal orientation to an altitude of about 10,000 meters before separation of the space vehicle from the lifting device in accordance with the launch operation. Kelly in his patent does a good job of arguing that a horizontal orientation of any space vehicle which carries a lot of its own fuel is superior to a vertical orientation of all rockets designs since the German V-2, including the Saturn V, which must embody massive reinforcement of the lower sections of the rockets in order to bear the tremendous weight when fueled of the upper sections and rocket stages. This penalty becomes especially acute because the tremendous acceleration rate of conventional V-2 type rockets greatly increases the weight necessary to be endured by all lower sections. The present invention and Kelly's invention ameliorate these difficulties by the horizontal positioning of generally tube-like space vehicles and by ascending the first ten thousand meters of the space launch journey more slowly, averting tremendous G-forces.

One main point of departure of the present invention from Kelly, besides the fact that the airborne lift platforms are completely different, is that Kelly will not ignite any rocket motors integral to the space vehicle itself due to fear of damaging the elaborate winged and dirigible platforms he has devised for the initial lifting purpose. The present invention may use rocket propulsion systems integral to the space vehicle throughout the take-off and ascent to about 10,000 meters at full power or near full power because the space vehicle is trailing the rest of the lift platform devices and not likely to ignite them, and also because the present invention provides for the replacement of all fuels aboard the space vehicle consumed during the gradual ascent.

The present invention also possesses advantages similar to the invention of Toliver, et al, 2000, in that the present invention will readily service low earth orbits to include but not limited to tailored orbits which may be distant from the latitude of the point of launch of a space vehicle. Toliver posits an L-1011 aircraft as a means of lifting his flyback vehicle to a desired launch altitude. The present invention could employ an L-1011 aircraft or any of a variety of smaller or larger aircraft to play the same role. Toliver does not anywhere in the description of his invention discuss fuels transfer or any means by which the velocity of his space flyback vehicle would significantly exceed the velocity of the parent L-1011 at the point of launch.

The present invention possesses advantages similar to the invention of Palmer, 1996, in that the Palmer patent envisions using a plurality of conventional aircraft tankers to haul fuels for propulsion to an altitude a little over 10,000 meters, and then refueling in flight the main lifting platform, which may in turn fuel the space vehicle. The present invention may benefit from the Palmer concept, with permission, and also may benefit from prior art in the realm of manufacturing propellant fuels aboard aircraft in flight, with permission.

CONCLUSION, RAMIFICATIONS, AND SCOPE

In conclusion, insofar as I am aware, no towed glider space launch method or terrestrial atmosphere spinning tether launch method formerly developed provides for a means by which (a) a plurality of tow vehicle impart their own momentum to the towed vehicle by means of a maneuver to generate centripetal force so as to significantly increase the velocity of said towed vehicle far beyond that of any of the plurality of tow vehicle (b) some of the plurality of tow vehicle use the principles of centripetal force and of mechanical advantage to also transfer the energy of their momentum to a stiff, semi-rigid tow pipeline or stiff aerodynamic tube of sufficient tensile strength (c) a copious by-product (i.e. nitrogen gas) of making liquid oxygen in flight will be put to good use in the essential precision cleaning of micro-holes in the primary upper and lower wing surfaces of the aerodynamic tow pipeline which enable laminar flow, particularly at speeds over Mach 1. A plurality of jet engine/turbocompressor sets that provide the vacuum for the micro-hole laminar flow envisioned will be providing about 40,000 ft-lbs of joint thrust each at leveraged points along the tow pipeline.

(d) a tow pipeline is able to convey both rocket fuel oxidizer, or other oxidizer, and rocket or jet fuel, enabling a space vehicle launch load to burn its own motors before separation from the tow pipeline without diminishing or wasting its on-board supplies, and to generally use centripetal force to significantly enhance the delivery of said oxidizer and fuels whereby the sum of the four advantages (a), (b), (c) and (d) all combine to significantly increase both the weight of a launch load and its velocity upon separation, with the further advantage that all of said launch components are reusable except the fuels.

Accordingly, besides the objects and advantages of the invention already described in the present patent application, several objects and advantages of the present invention are:

(a) to provide an economical means of lifting reasonable amounts of mass into a variety of sub-orbits, orbits, or to assist the objects in attaining escape velocity. It must be understood that the term "economical" presumes that the tools enlisted to express the centripetal reflex method of space launch (a method, after all) will be flexible enough to serve mankind's needs in other fashions. The expensive and irreversibly expendable first stage of a conventional rocket like the Saturn V obviously does not pass such a test. The present invention promises much greater mission flexibility at lowered cost as well. The Hubble space telescope may be destroyed by 2007 due to the lack of a billion dollars for the manned space mission to fix and supply Hubble. By means of the centripetal reflex method of space launch a 5,000 kg rocketplane or several of them could reach Hubble altitude on a few days notice for much less expense.

In fact, the centripetal reflex method of space launch may well replace the second and third stages of conventional rockets as well. It is within the realm of the numbers that tumble from the simplest equations that a smaller launch load of perhaps 500 kilograms could be flung all the way to the moon without burning any rocket fuel. Smaller space vehicles could be flicked to Mars or the outer solar system. Such feats could be accomplished by a large formation of aircraft and a long tow pipeline as will soon be specified to execute the centripetal reflex method, utilizing some existing aircraft as the typical tow vehicles that were mentioned previously, optimally the An-225 and a plurality of Grumman F-18Fs retrofitted with thrust vectored control engines as to be described in (g).

(b) as mentioned previously, one of the problems with any space launch system that attains high Mach numbers while still in the atmosphere is what happened to the shuttle Columbia. A fortuitous aspect of the centripetal reflex design is that anything that shakes loose from any part of the lengthy system will tend to be carried by the slipstream away from other assemblies. Stuff that comes off any of the tow planes other than the large transport aircraft in the preferred embodiment will tend to go under the main tow pipeline, which is behind and above the tow arrays of F-18 type aircraft at a 10 o'clock high position.

(c) to encourage the design and production of a very large, American-made, multi-purpose heavy transport aircraft powerful enough to fit the bill of the pivotal large transport aircraft.

(d) to encourage the realization that the aircraft envisioned in (b) would necessarily then possess many of the attributes necessary for a successful short-takeoff-and-landing STOL design.

(e) the same idealized very large transport aircraft mentioned in (b) and (c) might be configured as a 700-passenger airliner which, because it is over-engineered and over-built in the arenas of structural strength and controllability, might be represented as presenting the potential of a revolution in passenger safety when combined with the design's ability to accommodate the extra weight of a lot of safety features ruled out in existing aircraft because of weight concerns: such as overhead fire sprinklers in the entire passenger cabin and a water supply, heavier passenger seats incorporating air bags and more restraints, and more evacuation exits with wider escape ramps. A wide vehicle ramp serves as a passenger evacuation route that will not easily jam up with panicked human bodies.

(f) a large transport aircraft which could do all of the above would necessarily be less fuel efficient than other very large air transport, but this can be turned into an advantage by emphasizing that a high-capacity seaplane with STOL capability can fly directly to many destinations and can complete special assignments that would take a multitude of smaller aircraft, if feasible at all. The potential need for such a seaplane transport in the late 2004/early 2005 tsunami tragedy in SE Asia became glaringly obvious. Conventional airplanes could not take desperately needed relief supplies directly to the locations of greatest need. Relief efforts had to await for the arrival of helicopters and ships to ferry supplies that were piling up at the congested central airports.

Crowded conventional airports and devastated ground infrastructure such as roads and bridges cost thousands of lives. The issue of fuel economy for an airplane must always be measured against the situation. Even for recreational seaplane uses such as working in conjunction with cruise ship lines to avoid itineraries that back-track much of the voyage, fuel mileage must be calculated taking into account the economy of flying directly to a destination versus roundabout routing. Thus, by avoiding roundabout routings or doing the same job with many more aircraft, a net fuel savings can be accomplished by a larger, less-specialized airplane.

(g) a decided advantage of the centripetal reflex method of space launch is that it absolutely maximizes concepts and inventions well known to persons skilled in prior art, such as the powered CRWs. The usual advantages of CRWs are that they can mimic the performance envelope of helicopters and then transform so as to mimic the performance envelope of fixed wing aircraft. The centripetal reflex method takes full additional advantage of the ability of powered CRWs to assume special sweeps or cants that lie between fixed wing and complete rotor rotations. The ability to continuously change scissors wing orientation allows the CRWs to always be faced optimally into the local prevailing airstream, even along a coiling tow pipeline 14.

When the tow pipeline is in either flex or reflex mode it is coiling in a serpentine fashion relative to the primary instantaneous vector of forward travel. By their ability to track as semi-fixed wings in such as fashion as to always provide maximum lift or minimize drag during a continuous turn, CRWs as known to a person skilled in the art enter into a relatively unexploited realm of aeronautical practice. They are like swing wing aircraft only with a much greater range of freedom and responsiveness. During both the flex and reflex periods, the CRWs will work to keep the high-velocity end of the tow pipeline and the space load in an ascending orientation. Imagine the arm of a pitcher throwing underhanded, then lifting his arm for an overhand throw. The load is the high end of tow pipeline 14.

Similarly, the centripetal reflex method of space launch takes advantage of technological progress as known to a person skilled in the art in using high pressure nitrogen gas for precision cleaning tasks, takes advantage of the bountiful supply of nitrogen gas available as a result of making liquid oxygen in flight, takes advantage of laser-cut micro-holes in promoting laminar flow at high Mach numbers, takes advantage of the thrust of the jet engine turbo-compressor sets intrinsic to the laminar flow micro-hole system underneath the micro-porous foils as part of the laminar flow system to cool wing surfaces warming up due to aerodynamic heating, which waste heat will directly become part of the exhaust thrust of the air-breathing engines of the turbocompressor system.

Another material that the CRMoSL takes maximum advantage of is not only the strength and light weight of modern carbon composite fibers, but their ability to store potential energy and impart velocity. If the Romans had had materials like these they could have besieged cities with their catapults and ballistas from many more hundreds of paces away. The way that tow pipeline 14 is used in the CRMoSL is of importance. When this adaptation of old and new technology catches on, it will advantage humanity in many unanticipated ways, such as the storing of energy in ground facilities.

(h) as a practical matter, all of the foregoing advantages claimed for the centripetal reflex space launch method and a large transport aircraft capable of carrying out such a method can be achieved with existing technology. No materials or techniques not already accepted for general use are required to build a plurality of tow vehicles, the various controllers, the tow pipeline, or a plurality of computer programs necessary to control and direct the launch sequence. Any that come along in a fortuitous, affordable fashion can only make the centripetal reflex concept better. A major advantage of the CRMoSL is that some specific aircraft exist, are in general use, and are known to a person skilled in the art, which would yield excellent performance in the roles assigned them by this concept.

Particularly, the Antonov An-225 has been mentioned as a suitable for the pivotal large transport aircraft because one such aircraft actually exists, is available on a hire basis, and has been sighted doing hired work in the USA as recently as September 2004. The An-225 is a lunar fling vehicle as described in (b).

For the plurality of smaller tow vehicles assigned to towing arrays, jet fighter planes which possess thrust-vectored-control (TVC) would be the preferred candidates because of their very tight turning radii at high altitude. Examples of such aircraft include, but are not limited to, the Sukhoi SU-37, the F-22, the Joint Strike Fighter, and the AH-8 Harrier.

These military aircraft have hardened attachment points or pylons for weapons that would be suitable for the attachment of either tow lines or booms. Booms made of light carbon composite material might be used in an embodiment that would have the assist aircraft, or some of them, pushing the tow pipeline instead of pulling it. The chief advantage of this variation would be that the pilots could better observe what is going on with the towed structure and better separation could be achieved between tow aircraft if arrays were alternately towing or pushing the tow pipeline and on different sides of it.

Although it does not yet have TVC, the Grumman F-18F Hornet would be highly suitable if rumored retrofits of F-18 engines with thrust vectored control come about. In fact, the tow vehicle arrays (that consist of three TVC retrofitted Hornets in each array for a total of twelve) would be lunar fling vehicles as suggested in (b) when paired with the An-225 as the pivotal large transport aircraft in the preferred embodiment.

Hornets have the highly strengthened air frames necessary for carrier landings and integral tail hooks that would serve quite readily and well as strong tow points. The Hornets are already maneuverable and possess two engines that produce a total 44,000 ft-lbs of thrust. A plurality of a dozen Hornets that may be used as tow vehicles in the scheme of the CRMoSL could produce almost 500,000 ft-lbs of thrust collectively. As a package with the AN-225 and six jet engines in the sliding CRW tow packages plus four jet engines in the turbo-compressor groups (all of them F-16 engines), approximately 1,000,000 ft-lbs of thrust would be available to achieve the goals of the CRMoSL, not even counting the boost of the hydrogen peroxide system or the launch load motor! The "F" version of the Hornet has two crewpersons, which aids in the task of safely managing the tow formation and the recoil of the tow pipeline when whip-snapped. Furthermore, almost all military aircraft can carry external fuel tanks which would allow the F-18's in this instance to use their afterburners (reheaters) almost continuously from take-off to departure of the launch load without running out of jet fuel. Moreover, a large number of F-18's will become available as this Grumman airplane is phased out of military service to be replaced by a version of the Joint Strike Fighter.

Highly trained pilots and maintenance crews are available to support the F-18 and will be for decades to come. That might not be the case with the Antonov AN-225, but the American aerospace industry can remedy that disadvantage by producing its own very large transport aircraft with TVC or very large engines that swivel in some fashion.

(h) the aerial reflex space launch method, with its concomitant plurality of tow vehicles, will accept mating with a great variety of existing space orbiter designs, even those that were originally intended to be single-stage-to-orbit virtuosos, but which may have their payloads enhanced by the method of the CRMoSL. When launching unmanned space vehicles the performance of this method may be significantly increased, for one calculable limitation upon the concept is the necessity of not exceeding accelerations that humans can endure. It is not inconceivable that some lighter loads could be propelled to escape velocity without rocket assistance by the reflex method, even also without the optimal existing aircraft posited earlier.

Automated pilot systems known to persons skilled in the art will also be increasingly available for the plurality of smaller tow vehicles. Eliminating human pilots wherever possible would be desirable for safety purposes during the whiplash recovery stage, would also lower payroll costs, and would enable the plurality of tow vehicle to pull more "g's."

(i) all other recent space launch enhancement methods, such as elevators from space, MAGLEV rings to accelerate shuttle-like rocket planes, or the truly unusual magnetic space tram system called for in U.S. Pat No. 6,311,926, Powell, et al, (2001) would take decades to put into practice. The CRMoSL could come about before 2012.

In contrast to the Powell system and the others, a centripetal reflex method of space launch really is simple. The tow pipeline for the most part uses conventional types of carbon graphite materials for its construction. The tow pipeline proper has no moveable or warpable aerodynamic control surfaces or effectors of its own. The CRW's associated with it may have some, and some of the CRW's will move about on the tow pipeline, such that. manipulation of the sets and lift of the canard rotor wings may provide a mode of control. Otherwise, most of the steering and necessary trim settings will be accomplished by standard thrust vectored control associated with the conventional jet engines employed on the tow pipeline in several different roles. The jet engines will be conventional and will employ conventional means of thrust vectored control that may be ordered from the engine supplier with the engines. Other steering and control of the tow pipeline will be managed by the pilots of the tow aircraft, all of which in the preferred embodiment are prior art.

Building the tow pipeline is not that big a technical challenge. Powered CRWs of sufficient size will be built by someone soon anyway, they just need some straightforward adaptations to the CRMoSL. The tow trolleys on which most of the CRWs will be mounted and the other items are all routine aero-space engineering with no leading-edge miracles necessary. We will presently claim several peripheral innovations that may be costly to develop, but they are not essential to the good operation of the centripetal reflex method of space launch.

Otherwise, the cost of building the tow pipeline out of carbon composite materials should not be all that great, as a modular construction method to be disclosed in the specification will account for almost all of the substructure. If the AN-225 or an A-380 should not be available, a modified C-17 with strap-on rockets would do. The cost of developing the very large American tow aircraft of the additional embodiment might be a problem, but it was argued long and hard in (c), (d), and (e) how such an airplane could justify its development through other uses that would be important to humanity.

Such a proposed aircraft is technically quite feasible at the present time and not beyond the capability of the American aerospace industry. The challenge is to create one or several types of multi-purpose aircraft, preferably of very large size, in an age when most new conceptions are intended as extremely special purpose tools to fit narrow market niches.

The centripetal reflex method of space launch urges the return of a generalist approach to a multitude of aerospace challenges.

SUMMARY

In accordance with the present invention a space launch method comprises a plurality of aerial tow vehicle with or without with an extended trailing boom and diverted thrust engines, a relatively stiff main tube possessing significant mass and some aerodynamic lift of its own, a winged-glider or other space vehicle to be towed, a means of making and/or transferring rocket fuels in flight, and some necessary kinetic energy transfer maneuvers to be performed by manipulation of angular and linear momentum.

DRAWINGS—FIGURES

FIGS. 1A to 1F show various stages of the motions Formation AA performs in the centripetal reflex method of space launch.

FIG. 2A shows a table of suggested mass distribution for Formation AA.

FIG. 2B shows a table of the typical characteristics of the graphite composite fiber material in the five main sections of tow pipeline 14.

FIG. 2C shows a large-scale global view of the centripetal reflex method of space launch.

FIG. 2D is a table representing a logic flow diagram of the centripetal method of space launch, including proportional duration of each step.

FIG. 3 shows fixed end cap 16, a part of the method of space launch to which the launch load is connected for towing purposes.

FIG. 4 shows pivot yoke 18 and its means of connection to LTA 40.

FIG. 5 shows the internal ducting by which means jet engine/turbocompressor set 38 creates vacuum for the perforated micro-hole laminar flow system.

FIG. 6 shows the interior of LTA 40, including the area for making liquid oxygen and the way that piercing torsion rod 42 extends through the length of said aircraft.

FIG. 7 shows how minor deflection of piercing torsion rod 42 will be accommodated by a flexible rubberized curtain 120 modification to the front and rear fuselage of LTA 40.

FIG. 8 shows a typical method of connection of a plurality of tow vehicle arrays to the plurality of tow trolley 26, including safety features.

FIG. 9A shows a lateral cut-away view of a tow trolley 26 enveloping a cut-away section of tow pipeline 14 along which it slides.

Figure 1C:
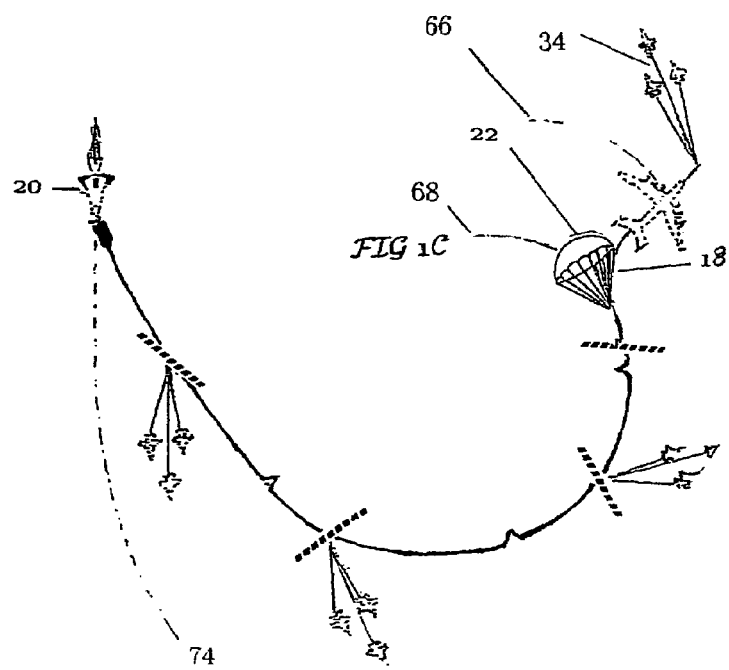

FIG. 9B shows a top plan cut-away view of a typical jet engine set 108 within a tow trolley 26, the oblique angle said trolley 26 makes to the main tube, and the ducts for the laminar flow perforated micro-hole system consisting of 50 and 52.

FIG. 9C shows a front cut-away perspective of a CRW tow trolley 26 and a sleeve joint 32, both found along tow pipeline 14.

FIG. 9D shows a cross section of tow pipeline 14 under flex and the top panel of perforated micro-hole laminar lift foil 50.

FIG. 10A shows a detailed cross section of the honeycomb graphite composite body 48 of tow pipeline 14, the plurality of transfer/storage pipe 36, and the plurality of traveling cleaning head 64 that will clean the micro-holes of micro-hole laminar lift foil 50.

FIG. 10B shows the simple method of construction of the substructure of tow pipeline 14 consisting of a plurality of honeycomb cell 46 chemically welded together latitudinally.

FIG. 10C shows that under each photo-voltaic cell 166 in the plurality of laminar evacuated air channel 52 can be found a cell that directly converts heat to electricity 168, FIG. 11A shows a blow-up view of a typical example of the plurality of automated traveling cleaning heads 64 that will maintain the plurality of micro-hole laminar lift foil 50

FIG. 11B shows an air foil constructed entirely out of very short fiberoptic tubes (mostly made of transparent material themselves except for silvering) glued together latitudinally.

FIG. 11C shows the construction of micro-hole laminar lift foil 50, the photo-voltaic layer that constitutes the ceiling (in this case) of the upper and lower laminar evacuated air channel 52, and also portrays mini-robot traveling cleaning head 64 at work.

FIG. 12 shows an alternative embodiment of Formation AA utilizing a plurality of purpose-built large transport aircraft 40 to replace tow lines and smaller aircraft.

REFERENCE NUMERALS 14 tow pipeline
16 fixed end cap
18 pivot yoke
20 launch load
22 parachute on 18
24 synthetic blend tow line
26 sliding CRW tow trolley
28 sliding tow vehicle array tether winch
30 fixed CRW
32 joint with internal dowell
34 fixed tow vehicle array dedicated to LTA 40
36 transfer/storage pipe
38 engine/turbocompressor set
40 large transport aircraft
42 torsion rod
44 solid outer shell, including base for high-temperature tiling where required
46 honeycomb cell
48 honeycomb graphite body
50 micro-hole laminar lift foil
52 laminar evacuated air channel
54 velocity of launch load at separation
56 temperature and stress sensor
58 tow couplings and breakaway tether winch
60 mechanism for making liquid oxygen in flight
62 compressible insulation
64 traveling cleaning head
66 swiveling TVC nozzle
68 a curve illustrating a trajectory
70 pressurant tank
72 jet fuel tank and supply line
74 launch trajectory
76 rotor wing hub
78 drogue controller on 18
80 zoned heating or cooling coil
82 parachute on 26
84 compressible insulation layer
86 control and instrument wiring bundle including fiberoptics and leads to all sensors
88 drogue controller on 26
90 front ribbon sheath trolley
92 rear ribbon sheath
94 parachute on 16
96 drogue controller 88 on 16 that initiates whiplash recovery system
98 socket for 42 to provide assured release controllers
100 systemwide controller and autopilot
102 micro-hole cleaning system controller
104 retractable landing gear and brakes
106 heating and cooling coil
108 jet engine
110 plenum for jet engine
112 jet exhaust route to CRW hub
116 backup multi-voltage power supply, with 60v., 120v, and 600 v. feeds
118 backup control & instrument line
120 flexible rubberized curtain
124 $H_2O_2$ tanks
126 $N_2$ tanks
128 auto-connect $H_2O_2$ port that uploads only when trolley 26 is properly positioned
130 trolley wheels and brakes
132 auto-connect fixtures
134 hydrogen peroxide safety system
136 all powered canard rotor wing controllers
138 flexible connections for control and instrument wiring bundles
140 flexible connections for fiberoptic cables
142 flexible connections for multi-voltage power supply transmission lines
144 flexible connections for liquid oxygen supply tubes
146 flexible connection for back-up control, instrument, and electrical power supply lines
148 auto-connect $N_2$ port
150 latching mechanism for launch load
152 back-up liquid oxygen transfer tube to launch load
154 other fuels transfer tube to launch load
156 all multi-voltage power supply lines, fiberoptics, and other control or instrumental wiring to launch load. Power supply includes 60v., 120v., and 600 v. feeds from LTA 40 or turbogenerators on all of the plurality of jet engines 108

158 positioning green laser
    160 heating red laser
    162 precision gas cleaning nozzle
    164 flow valve
    166 photo-voltaiccell
    168 thermo-couple cell
    170 disconnect valve
    172 outrigger video camera

DETAILED DESCRIPTION—PREFERRED EMBODIMENT—FIGS 1A TO 11

FIG. 1A is a top plan view of flight-worthy Formation AA constructed in accordance with the centripetal reflex method of space launch and pictured on a sufficiently wide runway at time T=−10 in takeoff ready mode prior to takeoff roll. Even after takeoff and during the ascension mode the elements of Formation AA will maintain this general relationship to each other, reference logic steps 100-104 in FIG. 2B. Tow pipeline 14 in this embodiment is two kilometers in length and is pictured in abbreviated form to fit the page. Since the angle of presentation that Formation AA makes to the runway is 45 degrees, the runway (not shown) must be at least 1.414 km wide or wider, to accommodate the variables of landing. The length of the runway should be about 4 km.

Tow pipeline 14 is connected to large transport aircraft 40 by pivot yoke 18. A launch load 20 is attached to fixed end cap 16 by latching mechanism 150. Close by can be seen the first of a plurality of canard rotor wing (CRW) tow trolley 26. CRWs are devices for flight known to a person skilled in the art. Additional CRW tow trolley 26 are shown along the tow pipeline 14 between pivot yoke 18 and fixed end cap 16. CRW assembly 30 is fixed in position.

The time intervals in method of space launch 10 discretely represented by the designations T=−10 to T=+55 may be from zero to 100,000 seconds and may not be equal in duration to each other. The CRMoSL being a method, necessary devices known to a person skilled in the art will be represented in lighter shades in relation to the primary, original devices of the CRMoSL.

For purposes of illustration only launch load 20 is portrayed as a winged glider rocketplane. Pivot yoke 18 is attached by torsion rod 42 to large transport aircraft (LTA) 40; torsion rod 42 passes through LTA 40 to attach to tow line 24, in turn attached to tow vehicle array 34.

At bottom, the centripetal reflex or fly rod method rests on the amazing properties of contemporary carbon composite materials and the present inventor's willingness to burn up as much conventional petroleum product in an hour in order to launch a space vehicle as a typical cruise ship might consume in taking 2,500 vacationers on a week-long jaunt. Some recent prior art which addresses the problem of reaching outer space envisions using carbon materials so strong that an elevator cable made of them could dangle from several hundred kilometers and support useful loads without breaking under its own weight. In the centripetal reflex method of space launch the load to be launched will be twirled at the end of a reflexively capable carbon tube, even as fuels transfer to it, then given a basic whip snap effect. In the centripetal reflex space launch method the launch load, in all these illustrations a generic rocketplane, will necessarily be insignificant compared to the total mass of Formation AA (about 0.3 of 1%.)

To support "10 g's" of acceleration, the tow pipeline tube (which in this embodiment has a length of about two kilometers) can be imagined as hanging straight down from LTA 40 and being twenty km in length, with suspended 5,000 kg launch load 20 at the low end also being multiplied tenfold to 50,000 kgs. Meeting this tensile strength requirement should not involve carbon materials that are wildly exotic (the type some engineers designate "unobtainium".) Even some metal may be used sparingly. To conform with later usage, we will hereafter refer to the miracle carbon main tube as tow pipeline 14, the large transport aircraft as LTA 40, and the launch load as LL 20. The CRMoSL also will call for 12 smaller tow aircraft (for a total in the preferred embodiment of twelve small plus one large aircraft.) All these elements combined we will term Formation AA. Later on we will designate the smaller tow aircraft more specifically according to role, but for discussion in the present application, and for purposes of easy visualization, we might refer to them as Grumman F-18 Hornets, although any aircraft of similar characteristics could also be used.

FIG. 1B At time T=+20 Formation AA commences a counter-clockwise (in this embodiment) ascending circling maneuver around a distant pivot point (not shown) which for purposes of comprehension only may be imagined as a position in the air at least 15,000 ft above local ground level. This maneuver is hereafter termed the twirling/transfer mode. Optimally Formation AA will ultimately reach 35,000 ft or more above sea level as fuel burns off and Formation AA lightens.

The turning, e.g. twirling, motion that Formation AA commences at T=+20 will transcribe various arcs in the sky. The arc transcribed by pivot yoke 18 of tow pipeline 14 is curve 68. The arc transcribed by fixed end cap 16 on tow pipeline 14 is curve 74. A plurality of tow trolley 26 are attached to a plurality of sliding tow vehicle array 28 by a plurality of coupling 58. Not shown are a plurality of ground vehicles which may be necessary on hot days to support tow pipeline 14 so that sagging does not cause contact with the runway. On return from high altitude tow pipeline 14 will be cold enough to maintain straightness and it will also be considerably lighter, fuels having been burned off.

FIG. 1C A plurality of parachute 22 on or near pivot yoke 18 appears in fully open condition. An instant before the plurality of parachute 22 deploys, LTA 40, torsion rod 42, and tow vehicle array 34 completely detach from pivot yoke 18 and exit the picture. Curve 68 describes the new arc transcribed by pivot yoke 18 as it is pulled around by the drag of the plurality of parachute 22 and the hard left banking of the remaining aircraft of the plurality of sliding tow vehicle array 28. Curve 74 can also be seen to be modified. In reality, the motion of LL 20 along curve 74 would be as it appears, but the actual trajectory of pivot yoke 18 along its curves is still in reverse due to its initial forward velocity of about 400-500 mph not yet being overcome. Curve 68 is therefore being transcribed as pivot yoke 18 is dragged backwards from left to right in relation to the top of the page. Curve 68 is more suggestive of the general geometry of the forces at work than the actual representation of the absolute motion of pivot yoke 18 against a fixed background. It should also be noted that curve 74 is only a curve until the instant of separation of LL 20 from Formation AA. Curve 74 at that moment becomes a straight line, at least until the trajectory of LL 20 is acted upon by other forces.

Figure 1D:
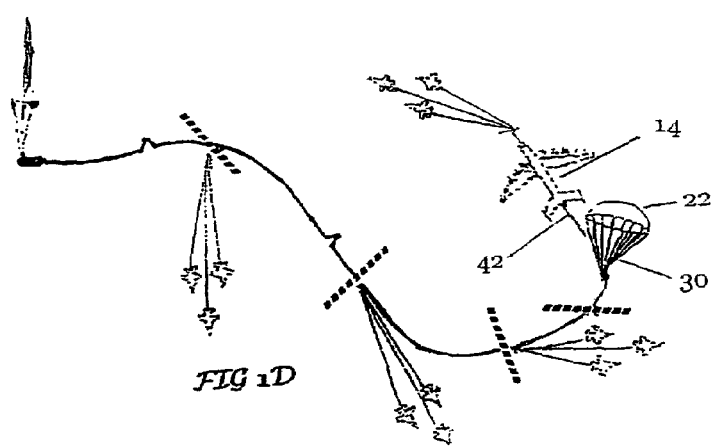

FIG. 1D At time T=+30 pivot yoke 18 will have slowed abruptly from T=+25, but the plurality of sliding tow vehicle array 28 are all still in various stages of banking hard left as they come under increasing load and slowing as they slide toward pivot yoke 18. As they actually approach fixed CRW 30, one by one the plurality of sliding tow vehicle array 28 detach from tow pipeline 14, which is bending back upon itself under strain. Within the molecular framework of tow pipeline 14 potential energy is accumulating. The first sliding tow vehicle array 28, and associated synethetic blend tow lines 24, can be seen cut loose from Formation AA and departing. Pivot yoke 18 and about a fifth of tow pipeline 14 closest to pivot yoke 18 have all had their forward velocity reduced to 150 mph or less, despite the engines of all the remaining aircraft being at full power. The small tow aircraft, in fact, are in or near stall condition when they cut loose, but they quickly recover. Before each of the plurality of sliding tow vehicle array 28 detach and leave, however, they have imparted an amount of energy to tow pipeline 14 along which they tracked and to the energy of LL 20, all due to the mechanical advantage of the inward slide, plus the laws of motion. In other embodiments, tow pipeline 14 could be 10 or more kilometers in length and feature another five or six sliding tow vehicle array 28, some of which may be pushers.

FIG. 1E At said time T=+30, fixed CRW 30, the plurality of sliding CRW tow trolleys 26, any engines associated with LL 20, and the inelastic momentum transfer going on in tow pipeline 14 have all been working to catch up to the tighter radius of turn initiated at T=+25. This is termed the reflex mode. Having been flexed through 60 or more degrees, tow pipeline 14 at time T=+30 enters reflex mode in order to straighten itself. During this period LL 20 will experience accelerations due to the reflex recovery of tow pipeline 14, the leveraged force of a plurality of sliding CRW tow trolley 26 acting upon tow pipeline 14, the power of a plurality of engine 108 and engine/turbocompresor set 38, and LL 20's own rocket burn, if applicable, which the centripetal reflex method of space launch assists by providing the rocketplane with oxidizer and/or other fuels up to the instant of separation from the residual stock in the plurality of transfer/storage pipe 36, boosted along by helium.

FIG. 1F At time T=+35 the aforementioned elements do catch up. Tow pipeline 14 is, for a brief instant, straight (in one dimension, as viewed from above.) This drawing does not quite show that instant of straightness, at which LL 20 is released by fixed end cap 16 to go on its journey, but a fraction of a second later. LL 20 is shown having cleared tow pipeline 14, the last portion of which has already deployed a plurality of parachutes 94 and 82 to control whiplash. These parachutes are steerable and assist the return of tow pipeline 14.

FIG. 2A is an illustrative table suggesting the approximate mass distribution in a plurality of zones in accordance with the preferred embodiment of the CRMoSL.

FIG. 2B is an illustrative table suggesting the approximate graphite material composition schedule in a plurality of zones in accordance with the preferred embodiment of the centripetal reflex method of space launch.

Now is the time to talk about the materials that will make up tow pipeline 14, for these capable carbon compounds lie at the heart and soul of this method. Modulus is a term used to describe the stiffness to weight ratio of the graphite composite the CRMoSL requires. In general, the greater the stiffness, the more the energy that can be stored in the inter-molecular forces of graphite composite when tow pipeline 14 is deflected in flex. From pivot yoke 18 to the first of a plurality of joint 32 the graphite polymer composite used to fabricate tow pipeline 14 should have a modulus rating of at least 50,000,000. From that joint 32 to the next joint 32 should be at least 55,000,000 modulus, and from the latest joint 32 to the next joint 32 should be at least 60,000,000 modulus. The latest joint 32 to the next joint 32 should be at least 65,000,000 modulus, and from the last joint 32 to fixed end cap 16 should also be 65,000,000 modulus. All the graphite composite used will be quite dense. Several factors urge the foregoing schedule regarding modulus. The first is cost.

Higher modulus graphite composite is much more costly than lower grades. The second main factor is safety. Higher modulus graphite composites tend to be more brittle and subject to micro-cracking from minor impacts or flaws that could result in catastrophic system failure. A concern for safety underlies every element of this concept.

Whatever the modulus value, all graphite fiber structures fabricated for inclusion in tow pipeline 14 or any other non-aircraft component of Formation AA should be in substantial compliance with NASA Specification 1.3.3.1 GSFC-752-SPEC-002.4×4 Specification for High-Modulus Graphite Filament Prepreg Material for Space Applications.

The purpose of a plurality of joint 32 in the drawings is to easily allow the complete substitution of any section of tow pipeline 14 outboard from pivot yoke 18 to fixed end cap 16. In order to customize the reflex performance of the whole system for launch loads vastly different in weight or intended orbit, it would be desirable to substitute sections of tube of different length and stiffness. It also can be anticipated that the section of tow pipeline 14 closest to the launch load may degrade from frequent use faster than other portions of the system. Each section of tow pipeline 14 is going to be made of a significantly different density of graphite composite—consequently, each section will vary considerably in weight and other properties. All the plurality of joint 32, however, will be identical in size and material construction, as will all tow trolley 26. Each tow pipeline 14 section of is made up of long polygonal cells glued together and the substructure of the CRW tow trolleys is made up of shorter cells similarly glued together. The polygons disappear in a structural sense, once the glue dries, forming an effectively seamless mass.

The plurality of identical internal joint dowels associated with the plurality of joint with internal dowel 32 are also all identical. Joint with internal dowel 32 and pivot yoke 18 should be made of kevlar™ and/or titanium alloys, or of equivalent or superior materials.

The pivot yoke 18, for instance, probably should be all metal because it needs to be both strong and tough in three dimensions. Carbon composite materials can be much stronger than metal in one or even two dimensions, but dependably durable strength in three dimensions given the present state of the art might be too expensive.

Tow pipeline 14, the key component of the present system, should be constructed of graphite composite fiber material. Because the present design for tow pipeline 14 calls for a plurality of channels and a honeycomb interior, it is intended that as many empty cells of the honeycomb as possible be filled with helium gas. The construction phase of each layer of the long cells should be flooded to saturation with helium gas. Tow pipeline 14 has on the order of two thousand cubic meters of low-density honeycomb volume, so this stipulation will provide a small amount of lift. Helium is initially expensive, but the inert gas should be sealed inside each long cell so that it rarely needs to be replaced.

FIG. 2C is a global view of CRMoSL showing upward spiraling climb and launch. Also represented are approximate values for some key parameters of the preferred embodiment of the centripetal reflex method of space launch assuming typical aircraft.

FIG. 2D is a table representing logic steps 100-114 of the preferred embodiment of the CRMoSL, which assumes a typical space launch mission.

FIG. 3 a top plan view of fixed end cap 16 revealing latching mechanism 150 to secure and release LL 20 and jet engine/ turbocompressor set 38, which in this embodiment will partially consist of two jet engine, as known to a person skilled in the art.

Also visible are liquid oxygen transfer tube to launch load 152, other fuels transfer tube to launch load 154, all multi-voltage power supply lines, fiberoptics, and other control or instrument wiring to launch load 156, door to parachute 94, and door to drogue controller 96. Tow pipeline 14 is also identified as it joins end cap 16.

FIG. 4 a perspective front view shows pivot yoke 18. The door to one of the plurality of parachute 22 on the backside is ghost drawn, as is an important interior feature, flexible connection for liquid oxygen supply tubes 144, to transfer liquid oxygen produced in large transport aircraft 40 that is piped through the interior of torsion rod 42 en route to tow pipeline 14. Because pivot yoke 18 will unlock and swivel in an emergency, flexible connections in this area will be required for all tubes and cables that originate in LTA 40, travel through torsion rod 42, and which must connect to tow pipeline 14 components. Also shown is socket 98 for torsion rod 42, and door to drogue controller 78.

The plurality of drogue controller 78, 88, and 96 may not select to physically detach the parachutes in an emergency or if they malfunction as long as they reliably deflate into a streamering condition and can be reeled in. Pivot yoke 18 also hosts one of a plurality of jet engine/turbocompressor set 38, not shown in this figure.

FIG. 5 is a perspective cut-away drawing of pivot yoke 18 that does show jet engine/turbocompressor set 38 and its relation to the plurality of AV-8 Harrier style TVC nozzle 66 that direct the exhaust of jet engine/turbocompressor set 38. The downward exhaust flow from this plurality of nozzle 66 after LTA 40 leaves Formation AA will do what it can to keep the pivot end from falling too rapidly, as will the plurality of parachute 22. Shown also is socket 98 where torsion rod 42 protruding from the rear of LTA 40 attaches to pivot yoke 18. It is at socket 98 where LTA 40 will disconnect from Formation AA at T=+25 and move to a safe distance.

FIG. 6 A cut-away lateral view of piercing torsion tow rod 42 and support frame 60 that will bolt to the cargo floor of a sufficiently large transport aircraft (LTA) 40. Frame 60 also supports modular mechanisms as known to a person skilled in the art for the manufacture and temporary storage of liquid oxygen and gaseous nitrogen at high altitude. LTA 40 is also shown hosting system wide controller and autopilot 100 and heating and cooling coil controller 106.

FIG. 7 A lateral cut-away shows typical modifications that will have to be made to the fuselage fore and aft of LTA 40 to accommodate piercing torsion tow rod 42 and preserve pressurization in the cargo bay if desired. Also depicted are a plurality of multi-voltage power supply transmission lines 114, backup liquid oxygen supply tube 116, backup control, instrument, and electrical supply lines 118, zoned heating or cooling coils 120, a plurality of flexible connections for control and instrument wiring bundles 138, a plurality of flexible connections for fiberoptic cable 140, a plurality of flexible connections for multi-voltage power supply transmission lines 142, a plurality of connections for back-up liquid oxygen supply tubes 144, and a plurality of connections for back-up control and electrical supply lines 146.

FIG. 8 a lateral view showing one of a plurality of tow coupling 58 which each contain very small diameter, long flexible tether lines and a recovery system respectively. The very small lines (not shown) of up to ten kilometers length are not intended to tow, but merely to allow all the plurality of tow vehicle array 28 to re-acquire their solid connection to tow pipeline 14 after whiplash recovery is complete so that they can tow the latter back to base.

FIG. 9A a cross section view depicts a sliding canard rotor wing (CRW) tow trolley as found interchangeably by the designations 26. Within the frame of tow trolley 26 is pictured the locations of parachute 82, drogue controller 88, trolley wheels and brakes 130, powered CRW controller 136, rotor wing hub 76, a plurality of transfer/storage pipe 36, hydrogen peroxide tank 124, jet fuel tank and supply line 72, and auto-connect H2O2 port 128. Important components of tow trolley 26 not shown in this view are retractable landing gear and brakes 104, jet engine set 108, or any of the ductwork.

FIG. 9B a top plan cut-away view of sliding CRW tow trolley 26. Shown are a plurality of jet engine set 108, a plurality of plenum for jet engine 110, laminar evacuated air channel 52, jet exhaust route 112 to rotor wing hub 76, but not rotor wing hub 76 itself.

FIG. 9C a perspective front cut-away view of sliding CRW tow trolley 26 positioned on a section of tow pipeline 14. Also shown is a joint with internal dowel 32. The normally hidden intake of one of a plurality of jet engine set 108 is shown in a local cut-away, as are upper and lower sections of plenum for jet engine 110. Shaded areas on the bottom and top of tow pipeline 14 represent a plurality of micro-hole laminar lift foil 50.

FIG. 9D a cross section lateral view of tow pipeline 14 to show displacement of a plurality of transfer/storage pipe 36 under flex. Also shown are a plurality of zoned heating or cooling coil 120 and auto-connect fixture 132 in typical placements. Auto-connect fixture 132 encompasses all connection ports for fiber-optic cables, multi-voltage power supply lines, control and instrument wiring bundles, and secondary fuel or oxidizer supply lines.

FIG. 10A A lateral cross-section of tow pipeline 14 reveals a honeycomb graphite body 48 and a plurality of compressible insulation liner 62. In this drawing the hollow center tubes of each honeycomb cell 46 are not drawn in to avoid cluttering an already dense drawing.

Tension and compression sensor instrument packages 122 also may be located in compressible insulation liner 62 but are not shown. On the portion of tow pipeline 14 from fixed end cap 16 to pivot yoke 18 lie front and rear Kevlar™ (a material known to a person skilled in the art) ribbon sheaths 90 and 92, or a plurality of sheaths of a comparable or superior material. Kevlar™ ribbon sheaths 90 and 92 also supply significant tensile strength. Adjacent to laminar evacuated air channel 52 can be seen one of a plurality of traveling cleaning heads 64 and thin guide rods are identified along which they will track. All of this hardware lies in or adjacent to laminar evacuated air channel 52. In sections of tow pipeline 14 subject to intense aerodynamic heating, the leading Kevlar™ sheaths will be replaced by ceramic fiber heatshielding tiles (this embodiment not shown.) The entire solid outer shell 44 should be covered with a blanket-type silicon heatshielding material.

It is not contemplated that high-temperature tiles similar to those that space shuttles typically use will have to bear the weight and stress that trolley wheels and brakes 130 apply to the Kevlar™ sheaths in normal operation. No tow trolley 26 will ever venture out on the last section of tow pipeline 14 nearest launch load 20 where the most intense aerodynamic heating is expected. This section actually could be of different outward dimensions than the rest of tow pipeline 14 and may be so in other embodiments or when customized for a particular launch mission by substitution of sections.

There will be another aerodynamic challenge to the tiles and other outer surfaces and stress-bearing substructure of tow pipeline 14 and trolleys 26, however, and that is the fact that some portions will necessarily be subject to supersonic air flow while others nearby are still experiencing subsonic local air. This is not considered to be a big problem because the line of the exact frontier between supersonic and slower air will constantly be shifting—moving towards pivot yoke 18 during twirling and whip-snap, and away during whiplash recovery. Thus the corroding effects of cavitation upon a local area will be of short duration. Several standard prior-art laminar flow enhancement systems feature elaborate channeling underneath the micro-porous foil that can deal with exactly such local pressure anomalies as the sonic frontier creates. The centripetal reflex method of space launch will employ one of these prior art laminar flow systems, adding only a compatible micro-hole cleaning system 102 and a different arrangement for creating the vacuum.

A more intractible effect of the constant sonic frontier throughout the launch attempt will be the aerodynamic drag associated with the phenomenon. Fortunately, tow pipeline 14 is a comparatively slender design, which will minimize this penalty. It is entirely possible that one or several of the plurality of sliding canard rotor wing (CRW) tow trolley 26 may pass through the frontier into hypersonic flight. That is why their outer skin is required to be the tough outer shell 44 material, and why their interior substructure must be the dense and strong honeycomb graphite body 48 construction. The conventional canard rotor wings and hub 76 will have to be evaluated for suitability to handle the sonic transition.

The diagonal cross-section of tow pipeline 14 also reveals solid outer shell 44. Looking more closely, it will be noted that honeycomb graphite composite body 48 is composed of a plurality of honeycomb cell 46. Imbedded in honeycomb graphite composite body 48 can be seen a plurality of large and small transfer/storage pipe 36. The former are encased in compressible insulation layer 62, which allows for transfer/storage pipe 36 to bend at a different rate than does tow pipeline 14. Also embedded in honeycomb graphite composite body 48 but not identified in this drawing are multi-voltage power supply lines 114, back-up liquid oxygen supply tube 116, a plurality of back-up control and electrical supply lines 118, zoned heating or cooling coils 120, and tension and compression sensor instrument packages 122, all of which will generally be located in the hollow, helium-filled interior channels of the plurality of honeycomb cells 46. Use of back-up tubes and lines for other purposes is reserved under this description. On the top and bottom side of tow pipeline 14 can be seen a plurality of perforated micro-hole laminar lift foil 50, and under each a plurality of laminar evacuated air channel 52 which leads to plenum 110 of a plurality of jet engine/turbocompressor set 38. Honeycomb graphite cells 46 are all tens of meters long and glued (chemically welded by methods known to a person skilled in the art) in overlapping patterns to form honeycomb graphite composite body 48.

Powered CRWs as known to a person skilled in the art commonly possess propulsion nozzles at the rotor tips which are supplied through interior piping in the rotors by jet engine exhaust gases or a pressurized propellant. The present invention will actually use both. Each tow trolley 26 possesses a jet engine set 108 and a hydrogen peroxide booster system which shares the same exhaust ductwork and rotor wing tip nozzles as the jet engine set 108. Part 124, a tank, is the principal component of the hydrogen peroxide booster system, along with hydrogen peroxide safety system 134.

In the present embodiment, hydrogen peroxide in liquid form as the pressurized propellant plays a role in backing up the jet engines. Each of the tow trolley 26 must therefore include at least one of a plurality of hydrogen peroxide tanks 124 for the storage of the liquid. The pivot yoke 18 may also have a plurality of hydrogen peroxide tanks 124. When hydrogen peroxide tanks 124 are present so will be hydrogen peroxide safety system 134. Apparatus known to a person skilled in the art for suitably pumping and controlling the flow of the hydrogen peroxide from the tanks to the shafts, thence to the rotor hubs, thence to the rotors, and lastly to the rotor tip nozzles of typical CRWs, will all be designated in all figures as CRW controllers 136, which also control the local jet engine set 108.

FIG. 10B shows the simple method of constructing the substructure of tow pipeline 14 and other structures in Formation AA. The basic building block is the hollow polygonal tube we have been referring to as honeycomb cell 46, which is made of carbon graphite composite material as specified by NASA in 1.3.3.1 GSFC-752-SPEC-002×4 and further described in FIG. 2B. These tubes will be chemically welded together by methods known to a person skilled in the art with b-stage thermoset resin under pressure and temperature to a fully thermoset state. The tubes will be up to 100 meters long and laid down in overlapping patterns butted and glued end-to-end so that no end joints coincide within the same decimeter of tow pipeline 14 length. The interior hollow passages of these tubes will be filled with helium gas at 0.7 atmosphere and may or may not be periodically plugged. These hollows may also possess liners (not shown) of 0.5 mm to 10 mm thickness made of Teflon™, stainless steel, or similar material and may serve as transfer/storage pipe 36.

FIG. 1C shows a standard photo-voltaic cell 166 mounted directly atop a standard thermocouple 168, so that thermocouple 168 in its normal operation will cool the upper cell 166. Also illustrated is one means of joining the electrical power out-put of both cells.

FIG. 11A shows an expanded view of an automated traveling cleaning head 64 that will maintain the plurality of micro-hole laminar lift foil 50 while in flight. The duty of traveling cleaning head 64 is to clean the micro-holes with tiny but very precise blasts of high pressure nitrogen gas. Flow Control International of Kent, Wash., supplies such cleaning systems. Every traveling cleaning head 64 must locate itself with exquisite precision during the process, using positioning green laser 158 for this purpose. A candidate control system for the location process is Nutec Components, Inc.'s (Deer Park, N.Y.) flex-drive ten series.

Only six parts are identified by number in this illustration, which is a blow-up of traveling cleaning head 64, reference FIG. 10. Part 64 is actually an autonomous mini-robot capable of navigating the baffles, gates, plenums, and manifolds of an advanced, standard laminar flow vacuum system. The robot itself would be similar to mini-size welding robots, like Motoman's (Columbus, Ohio) SV3X series, which boasts a 3 kilogram tool load capacity. Auto-connect nitrogen port 148 allows uptake of gaseous or liquified nitrogen when traveling cleaning head 64 is precisely stationed for replenishment, which it periodically requires. It will operate off of ni-cad batteries or the equivalent, which will also need to be periodically recharged at the same time as the nitrogen replenishment, but the standard devices and arrangements for that are not shown, nor are part 64's connections to micro-hole cleaning system controller 102 through fiberoptic cable, also not shown. Shown are one of a plurality of standard positioning green laser 158, one of a plurality of valve 164, one of a plurality of heating red laser 160, and one of a plurality of precision gas cleaning nozzle 162. Not shown are any of the conventional control, power, and instrument wiring bundles, actuators, fittings, and circuitry that will attend this apparatus.

All in all, it is envisioned that up to a thousand mini-robot traveling cleaning head 64 will be on patrol in two-kilometer long upper and lower laminar evacuated air channel 52. This would equal 500 cleaning head 64 per kilometer, split 250 upper channel, 250 lower channel, each responsible for four square meters of surface. Each cleaning head 64 mini or microrobot should weigh from 0.1 milligram to 50 kilograms and have outer dimensions of more than 0.1 mm by 0.1 mm by 0.1 mm, but less than 1 meter by 1 meter by 1 meter.

FIG. 11B shows a cross-sectional lateral view one of the plurality of micro-hole laminar lift foil 50 as it appears in construction. In the preferred embodiment, a mostly transparent fiberoptic tube with an internal hole of about 50 microns will be chopped up in millions of uniform segments about 0.5 mm in length to embodiments where all would be 10 mm in length. These segments would then be latitudinally chemically welded together, perhaps using pressure and heat, to form a strong foil with millions of micro-hole perforations expected to pass both air and light of shorter wavelengths. The fiber-optic cable chosen would have to resist deformation at high temperatures. The foil would be molded into the aerodynamic contour desired for the laminar lift foil. It would be produced in sections of 10 to 100 meters and chemically welded by methods known to a person skilled in the art end-to-end to produce the desired two kilometer or more length as a strong, continuous piece.

Another embodiment would start with a suitably cut sheet of transparent material like 5-10 mm thick Lexan™ and millions of micro-holes would be drilled in it with lasers. In the end sections only, this material also would have to be specially formulated chemically to withstand high temperatures. If not, a high temperature, moldable glass can be substituted.

FIG. 11C an interior lateral view of portrays traveling cleaning head 64 at work inside lower laminar evacuated air channel 52 of tow pipeline 14. Head 64 when topside makes wheel contact with photo-voltaic cells 166. When bottomside, its wheels run on the inner surface of micro-hole laminar lift foil 50 that it is cleaning. Before further cleaning commences, head 64 relocates to a new sector and inflates a pneumatic wedge to hold it firmly in place. Only then does the precision locator initiate contact with the subject holes.

FIG. 12 This drawing of the additional embodiment identifies the replacement of all the plurality of sliding tow vehicle array 28 by iterations of the new large transport aircraft 40. Also gone are fixed tow vehicle array 34 and piercing torsion rod 42. Still present are tow pipeline 14, fixed end cap 16, and a plurality of joint with internal dowel 32. Please note that by convention of sketching technique throughout this application the plurality of small kinks in tow pipeline 14 represent both the approximate location of a plurality of joint with internal dowel 32 and the abbreviation of the length of tow pipeline 14. Neither tow pipeline 14 nor any of the plurality of joint with internal dowel 32 in reality is kinked.

OPERATION

Although the present invention is described with respect to a centripetal reflex method and system for the launch of space vehicles into orbit, or beyond, the present invention may be adapted for various applications and systems known in the art.

In the following description, various operating parameters and components are described for one constructed embodiment. These specific parameters and components are included as examples and are not meant to be limiting. The centripetal reflex method of space launch would modify the Clapp method mentioned earlier in that the oxidizer (in liquid form) would be continuously manufactured in the tanker aircraft, a process known to a person skilled in the art, and afterwards transferred to the towed vehicle via a suitable tube. Centripetal force during the spinning maneuver will enhance the transfer and help overcome the friction penalty of a tow line/transfer tube that may be several kilometers or more in length. The present centripetal reflex method also specifies that a plurality of both temperature and stress sensor unit 56 and zoned heating and cooling coil 80, as well as thermal compressible insulation 62, be integral to the long tube so as to keep the liquid oxygen flowing and to prevent the specified tube itself from becoming too brittle. Moreover, tow pipeline 14 is one of the type of high-altitude, fast air vehicles that critically rely upon the liquid fuel in their tanks as a heat sink to dissipate the heat from atmospheric friction at high velocities. Others of this type were the Concorde and the SR-71.

The centripetal reflex method, in contrast to Clapp, contemplates refueling rocket engines that have been and are in use. The tanker airplane may as well be large and powerful enough to tow substantial necessary launch apparatus to launch altitude. The tanker tow aircraft and the rocketplane in the centripetal reflex method can together get a longer burn from launch load 20's rocket motor adding to the spin velocity. The rocketplane can receive electrical energy and control inputs in the event it has to loiter at altitude during a long commute to the launch zone or a longer-than anticipated amount of time that might be taken by the tanker plane in producing enough liquid oxygen and readying it for transfer, or any other unforeseen delays. Clapp regards oxidizer consumed during the transfer period as an irreplaceable net system loss, but the centripetal reflex method utilizes every drop for some type of positive gain.

Recall that the Clapp scheme proposed a variety of large aircraft to serve as the tanker to deliver oxidizer in a timely fashion to space vehicles. Mentioned were the the Boeing 707 or 747, the Lockheed L1011, the Douglas DC-10, existing KC-135 tanker aircraft, and the C-17. The centripetal reflex method could utilize any of the foregoing, or the Antonov An-225, or a cargo version of the Airbus A-380. A purpose-built but still versatile new American very large transport aircraft, of course, would also fill and even expand the role.

Moreover, large transport aircraft (LTA) 40 and the Grumman F-18s in the tow vehicle arrays will begin a spinning or "twirling" maneuver to force a substantial portion of their own kinetic energy to migrate to the rocketplane even as liquid oxygen is pumped over to the latter.

The tow vehicle formations will react to the final acceleration maneuver of parachute braking at the pivot by remaining aircraft commencing full-power turns with the assistance of vectored thrust engines. In order to turn tightly in the thin air at the target altitude an additional embodiment would utilize a built-to-purpose large transport aircraft 40 that will particularly feature "diverted" or "directed" thrust from its powerful main engines, a process sometimes referred to more formally as thrust vectored control, that could replace all of the smaller tow vehicles of F-18 type, reference FIG. 12.

In order for the scaled-up classical physics of this concept to work in practice, both a formation of tow aircraft of two different sizes and a tow pipeline which will be spun or whirled with a space craft at the fast end will altogether be rather massive indeed. To accelerate a 5000 kilogram/11,000 lb. gross weight space vehicle by more than a factor of ten this invention requires total tow vehicle weight of about 1,840,000 lbs (with fuel), necessary to support the approximately 1.2 million lb mass of the tow pipeline including CRW tow trolley, frames, and up to 100,000 kg/220,000 lbs of jet and rocket fuel so that a rocket-equipped launch load can use its own rocket engine a lot before it separates and goes on its way.

These generous figures would actually accommodate a larger rocketplane than the 5,000 kg one used as an example. The total weight of the formation in flight is therefore about 1,350,000 kgs or 3,000,000 pounds as configured. Launch load 20 represents about one-third of one percent of the total weight of the spinning tow pipeline formation AA.

Assuming that the center of mass of a typical formation of airplanes and equipment attempting the centripetal reflex method of space launch will be at 35,000 ft at an average speed of 450 mph during twirling, towing a typical rocketplane, and that the average velocity of the center of mass when the rocketplane releases after a pivot point is set in mid-air by the deployment of a plurality of parachute 22 will only be about 150 mph, the energy of the combined linear moment of inertia at the instant expulsion mode begins sensed by the launch load will equal about 1,500,000 lbs times a delta v of 400 mph or 600,000,000 mile-pounds per hour. While most of the mass of the formation is decelerating, used up (in the case of fuel) or has disconnected from the formation, the light end of tow pipeline 14 where the rocketplane resides will be accelerating.

If the conversion of momentum to velocity at rocketplane launch load 20 is only 5% efficient as the pivot yoke 18 end of the tow pipeline slows less than 50 mph, rough calculations (taking into account total fuel burn and estimated drag) suggest that a 5,000 kg rocketplane or other 11,000 lb. load should still be accelerated well past 5,000 mph. A 500 kg space vehicle on a customized end section should be in for a trip to Jupiter.

In reduced physical analysis, the flexing of the tow pipeline is only a means of converting the moments of inertia of multiple aircraft and some weighty attendant apparatus into kinetic energy that may be stored briefly as potential in the stiffly semi-rigid tow pipeline and then smoothly transferred to the rocketplane launch load. The concept of transferring liquid oxygen manufactured in flight as well is an incidental scheme known to a person skilled in the art that recommends itself because it would fit in neatly with the other ingredients of this invention. Because the air is thin at the launch altitude envisioned and the materials chosen for the construction of the stiff, semi-rigid tow pipeline create very little waste heat when flexed, it is hoped that the conversion of the over-all angular momentum of the tow pipeline and its tow aircraft into increased departure velocity for the space vehicle launch load will far exceed 5% efficiency.

A more immediate problem is what to do about the aerodynamic heating that will soon follow upon the fast end of the tow pipeline, should it indeed be accelerated as dramatically as claimed. Presumably, launch load 20 if it is a rocketplane will have its own thermal protection already provided to endure the temperatures of re-entry. Other launch loads may require special shielding. Up to a kilometer of the modular, sectionalized tow pipeline itself must be designed with the heat problem in mind.

Both the cryogenic liquid oxygen and nitrogen continuously served down the tow pipeline from the large transport aircraft will act as heat sinks which are consumed and dissipated to the atmosphere. The energy source for concentrating the gases is solar in the preferred embodiment. The architecture of the tow pipeline is such that convective heat transfer will be much more efficient at the fast end of the tow pipeline, peaking at the point of attachment to the launch load. The liquid nitrogen is delivered to serve as a means of keeping the micro-holes of the laminar flow system clean. The laminar flow system intrinsically serves as a means of ventilation constantly drawing in cooler air and expelling hotter air. The heating element in the liquid nitrogen start tank of micro-hole cleaning system 102 will be electrical for the takeoff and ascent portion of the flight, but thermally conductive metal that directly extracts heat from the outer metal surfaces of the tow pipeline's outer skin will take over when aerodynamic heating reaches a predetermined value. Excess liquid nitrogen available can be sprayed directly on interior hot spots.

Before cooling will be necessary, however, let's discuss just how the centripetal reflex system gets anything moving so fast that aerodynamic heat will even be a problem.

It is probably easiest to conceptualize the actual launch energy accumulating in two stages: the spin or twirling cycle and the whip snap cycle. At the final moment of the spin cycle the twirling will have proceeded until large transport aircraft 40 is circling (with considerable aid from tow formation 34) in about a 2.5 "g" turn at 450 mph. Curve 68 traced out by LTA 40 is a circle with a diameter of about 4 kilometers and a circumference of about 12.5 kilometers that LTA 40 covers once a minute. Out on the periphery launch load 20 is moving at about Mach 1.5 to complete its bigger circle in one minute. This is not a very comfortable 2.5 "g" turn for any of the pilots, for they are not being pressed against the back of their seats, but against their seat belts and the right side of their bodies.

At T=+25, a plurality of parachute 22 near pivot yoke 18 all come out. LTA 40 has to release and dive away. Tow vehicle array 34 will remain attached to LTA 40 until sure that it is clear of tow pipeline 14. Tow vehicle array 34 will later come back to the tow pipeline after whiplash recovery is complete and re-attach to coupling 58 by a snag method. The other tow vehicle arrays have also moved out to a safer distance, but each remains attached by a loose tether line. Winching in this tether line they re-establish solid connection with the plurality of synthetic blend tow line 24. LTA 40 remains in over-all control of the whole process through standard radio frequency telemetry.

When LTA 40 released and flew away, each successive sliding CRW tow trolley 26 began approacheing pivot yoke 18. As each trolley 26 reaches a predetermined location, its respective tow vehicle array 28 releases and distances itself, remaining loosely attached. When the major display of parachute 22 appeared pivot yoke 18 came virtually to a stop.

The whip-snap cycle began at that time. All the energy stored in the flexed tow pipeline 14 and all the fuel and oxidizer remaining that is trying to crowd down-line motors to accept it with intense pressure now has one outlet along which to express—it will mostly become velocity 54 along launch trajectory 74.

Launch load 20 in essence is a normal rocketplane with engines at full power that happens to find itself above 35,000 feet attached to a topped-off 2 kilometer fuel pipeline that is solidly anchored on the other end by deployed parachutes. The anchor end will not sink very quickly because it is held up by standard jet engines with TVC nozzles and four CRW's whose rotors may return to helicopter mode for lift at slower speeds. Launch load 20 can ride this situation until the fuel is exhausted or the lateral acceleration becomes unbearable. It will certainly get into a velocity range where scram jets associated with itself or the fixed end cap 16 become feasible.

Obviously, a space vehicle specifically designed and built for the centripetal reflex method of space launch would be optimal, but special cradles should also be readily built that would accommodate most space vehicles to this method of space launch.

If the rocket motor associated with launch load 20 is not large enough to consume all the liquid oxygen being supplied to it during the final, rapid spinning of the tow pipeline immediately prior to launch, the afterburners (reheaters) of the conventional jet engines associated with the plurality of laminar flow enhancement turbocompressors 38 located near where launch load 20 releasably attaches to end cap 16 or elsewhere will have to burn off the rest. This will be done by direct injection of the oxygen after it is converted to gaseous form in its own start tank. Little modification to the afterburner shroud or the elements of the TVC system should be required to achieve comparable thrust from that use of the oxidizer to what would be expected from a rocket motor, but it may be desirable to establish optimal settings for the thrust vectored control deflectors during this regime. Injecting oxygen into an afterburner is not only known to a person skilled in the art, but a method recommended for reducing pollution by burning fuel more completely.

The preferred embodiment portrayed in this application contemplates the slightly less-than-ideal (but practical) employment of an existing large transport aircraft such as the Antonov An-225. Use of such a conventional aircraft forces the use of a plurality of drogue parachutes 22 and a yoked array of towing aircraft 34 at the nose to turn large transport aircraft 40 as quickly as desired in the spin cycle. Also integral to the latter embodiment is piercing torsion tow rod 42 which will extend the length of the cargo deck of LTA 40 and connect tow pipeline 14 to tow array 34 at the nose of the LTA 40 through one of the plurality of tow line 24.

In the additional embodiment, reference FIG. 12, some elements may be reduced in size or even eliminated, because the tow pipeline 14 attaches directly to a purpose-built very large transport aircraft 40 at its rigid, extended, trailing boom such that no interference of the tow pipeline 14 with the tow vehicle should occur. Extended tail boom designs for aerial towing are covered in prior art such as Piasecki, as well as certain algorithms for computer-controlled towing maneuvers.

Referring now to FIGS. 1 through 12, the sub-unit CRWs, whether fixed (30) or on sliding tow trolley (26), play a critical role in getting the long and ungainly tow pipeline 14 off the ground. Basically, each standard CRW, as known to a person skilled in the art, is a part-time gyrocopter which gets its lift partially from the air speed generated by all the tow aircraft, but which CRWs as appropriated for the present invention are able when maximum lifting power or a safety backup is desired to propel themselves by the both the expulsion of hydrogen peroxide rocket fuel and jet engine exhaust gases through their rotor tips, as also known to a person skilled in the art. They will also provide considerable lift in either auto-gyro rotation or as fixed wings when their fuel runs out and they are no longer self-powered.

CRWs, when they transition by processes known to one skilled in the art, become effective fixed wings mainly to avoid unique problems that rotors typically experience when their own rotational velocity plus the forward velocity of the entire system near the speed of sound under local conditions, such as the advancing tip Mach number problem and the retreating blade stall problem. To reduce drag at even higher speeds, the CRWs may be oriented like scissors wings, at some angle from 0 to 90 degrees relative to the immediate longitudinal axis of tow pipeline 14, an important feature for this invention.

Tow pipeline 14 represents an integral part of the centripetal reflex method. As envisioned in the present embodiment tow pipeline 14 will have a length of close to 2000 meters. At the point where it attaches to large transport aircraft 40, raindrop shaped tow pipeline 14 will be very approximately some multiple of 1.0 meter by 1.75 meters in shape. Unlike a leather whip or a fishing rod, tow pipeline 14 will not be tapered. Because the plurality of tow trolley 26 will be mobile up and down tow pipeline 14 using it as a track, it is necessary to keep the outer dimensions of said tow pipeline 14 unvarying. The density of the graphite material used to construct tow pipeline 14 will vary in each of its five or more sections, however. The most dense (cross-sectionally strongest) section will be at the end where large transport aircraft 40 attaches through pivot yoke 18. The least-dense segments will be nearest fixed end cap 16 at the point of attachment to launch load 20. A plurality of transfer/storage pipe 36 will run the length of tow pipeline 14, serving as the conduit for liquid oxygen or other liquid or gaseous rocket fuel components. Also running the length of the tow pipeline 14 will be layers of thermal and electrical insulation 84, back-up multi-voltage power lines 116, back-up control & instrument wiring 118, back-up liquid oxygen transfer tube 152, and all mainline multi-voltage power lines, fiberoptics, and other control & instrument wiring to launch load 156.

After takeoff at time T=0, FIG. 1A therefore now shows a rocketplane as known to a person skilled in the art being towed as launch load 20 to desired launch altitude in ascent mode. During the ascent liquid oxygen will be continuously manufactured by mechanism of making liquid oxygen in flight 60, reference FIG. 6, a process known to a person skilled in the art. A by-product of concentrating oxygen from the atmosphere is nitrogen gas. Both liquified oxygen and the gaseous or liquified nitrogen will be pumped into a plurality of transfer/storage pipe 36, reference FIG. 10, in tow pipeline 14. One of the plurality of transfer/storage pipe 36 may be dedicated to storing hydrogen peroxide for use in supplemental powering of the plurality of powered rotor wings of tow trolley 26.

When desired launch altitude is achieved at time T=+10, both tow pipeline 14 and the plurality of tow trolley 26 involved still exhibit an oblique approach to the direction of travel to overcome the substantial air resistance which opposes the lengthy framework being dragged to high altitude. Some of this resistance is due to induced drag, as tow pipeline 14 does possess a slightly aerodynamic rain-drop shape which will produce some lift, reference FIG. 10.

The lift which tow pipeline 14 produces will be selectively supplemented by a plurality of active perforated micro-hole laminar lift foil 50, as known to a person skilled in the art, on the upper and lower surface of tow pipeline 14. These panels will each be about one meter wide and up to the same length as tow pipeline 14. The panels will be perforated with about 3 million microscopic laser-cut holes per meter of length, as known to a person skilled in the art. Through these holes jet engine/turbocompressor set 38 will draw outside air by means of creating a vacuum inside tow pipeline 14 in laminar evacuated air channel 52, located immediately under perforated micro-hole laminar lift foil 50. The CRWs integral to the tow trolley 26 and fixed CRW 30 are supplying another portion of the lift requirement during this phase, powered by integral jet engine set 108 and a 50,000 kg reserve of purified hydrogen peroxide fuel, all of which exhausts through wing-tip rotors, as known to a person skilled in the art, reference FIG. 9C. Hydrogen peroxide fuel held in one of the plurality of transfer/storage pipe 36, reference FIG. 10, will be accessed by tow trolley 26 when they are stationed above one of a plurality of auto-connect H2O2 port 128 on tow pipeline 14.

Use of micro-hole perforations to enhance laminar flow brings up the significant problem of how to keep the holes clean. Other inventors (like Gadzinkski) call for reversed flow to solve the problem. The present invention employs reverse flow in the sense that the plurality of jet engine set 108 on the CRW tow trolley 26 intake all their air through about fourteen square meters of perforated micro-hole laminar lift foil 50 that is engulfed by sliding CRW (CRW) tow trolley 26 as it moves. This is not really reverse flow, however, because the plurality of CRW jet engine set 108 on 26 will always pull in their air the same direction. Most of the micro-holes, on the other hand, will normally experience air flow in the other direction because the suction generated by the plurality of jet engine/turbocompressor set 38 at fixed end cap 16 and pivot yoke 18 pulls air from the outside into tow pipeline 14.

A last, minor source of lift available to raise tow pipeline 14 to launch altitude will be the lighter-than-air displacement caused by approximately 2,000 cubic meters (in this embodiment) of helium in a plurality of honeycomb cell 46 within graphite composite body 48, reference FIG. 10. For every meter of length, tow pipeline 14 counts a little over one cubic meter of helium. Each cubic meter only supplies about 0.5 kg of lift, for a total over the 2,000 meter length of tow pipeline 14 of 1000 kg, but the helium does replace volatile atmospheric oxygen inside tow pipeline 14, which is a safety factor.

Since tow pipeline 14 is so very long, fuels in its plurality of internal transfer/storage pipe 36 constitute a significant storage total. In fact, most of the 50,000 kg of hydrogen peroxide will be distributed evenly throughout tow pipeline 14 in one of the plurality of transfer/storage pipe 36 of uniform diameter. The tow trolley 26 will have to be temporarily stationary over one of a plurality of certain locations at which can be found auto-connect hydrogen peroxide port 128 and a plurality of auto-connect nitrogen port 28 in order to access these substances. Similarly, 50,000 kg of jet fuel is included for the plurality of jet engine/turbocompressor set 38, which will be stored in one of a plurality of transfer/storage pipe 36 of tow pipeline 14 and is already included in the estimated weight total of Formation AA. Having both jet fuel and liquid oxygen in close proximity in a bendable structure justifies the flooding of the honeycomb cells with helium for safety reasons. Other areas will be flushed with inert nitrogen gas manufactured in large transport aircraft 40 and available from one of the plurality of transfer/storage pipe 36.

Helium will be permanently sealed in as many closed spaces in tow pipeline 14 as possible. The helium should be heated to above 300 degrees F. before being sealed up. When the gas cools, the whole interior of tow pipeline 14 will be at about 0.75 of an atmosphere. In various embodiments the interior structure may be long honeycomb cells or a foam-like substrate containing bubbles of helium. The plurality of transfer/storage pipe 36 are all temperature regulated by heating and cooling system 120, reference FIG. 4.

Because the twirling maneuver embodied in this invention takes place near the low stratosphere, air resistance to the towed vehicle and Formation AA should be minimal, so that relatively minimal energy will be sacrificed to the atmosphere in this transition phase. Once the intended space vehicle is in geographical position for launch, large transport aircraft 40 will begin the twirling by veering away from the towed load, in a level or an ascending plane relative to the horizon.

The plurality of tow vehicles in fact turn continuously and as tightly as the formation is physically able using ample control surfaces and the directed thrust from the engine of the smaller aircraft in the tow arrays. Large transport aircraft 40 will try to maintain airspeed by applying maximum power from its air-breathing engines and possibly from solid or liquid fueled rocket-assist engines semi-permanently attached to large transport aircraft 40 or tow pipeline 14 in an additional embodiment (not shown). Such engines may or may not consume liquid oxygen manufactured in 14 itself and/or liquid oxygen may be injected into afterburners (reheaters) on the air-breathing jet engines of large aircraft transport 14 or the other tow vehicles to enhance their high-altitude performance during twirling mode. Formation AA continues in the counter-clockwise circling maneuver, gradually able to tighten the radius of the turn further as fuel burns off. As further decrease of the radius of the turning circle becomes aerodynamically impossible, the entire Formation AA should now settle down at relatively steady angular velocities, with the slowest elements near pivot yoke 18 and the fastest at fixed end cap 16. The actual target velocity at fixed end cap 16 in twirling/transfer mode should be near or in excess of Mach 1.5. LTA 40 and tow vehicle array 34 pulling it will be attempting to reach and maintain 450 mph despite their circling motion. Their combined motion sweeps out a section of a two-dimensional semicircle (not shown) that lies in a single plane that is level or slightly inclined, with the high edge of the semicircle congruent with intended launch trajectory 74. Formation AA optionally may have completed multiple complete rotations during the performance of the maneuver represented in FIG. 1B, plus the partial rotation represented by the semicircle, which optimally should be at least 270 degrees.

As time advances from T=+20 Formation AA will continuously tighten the radius of its motion even while attempting to continue gaining altitude. While this constriction of the turning circle proceeds, liquid oxygen which has been manufactured aloft during the flight by a process known to a person skilled in the art within LTA 40 will be moved along through the interior of tow pipeline 14 by pumps and/or helium pressurant from tank 70 by processes as known to a person skilled in the art, assisted by centripetal force. The liquid oxygen actually moves through one of the plurality of transfer/storage pipe 36, reference FIG. 10A. The liquid oxygen is destined for a plurality of internal tanks (not shown) within launch load 20 or for immediate consumption in rocket motor or the reheaters of the plurality of jet engine/turbocompressor set 38, which all have afterburners (reheaters.)

At T=+25 a plurality of parachute 22 on or near 18 deploys on order from drogue controller 88 mounted on pivot yoke 18. Simultaneously, pivot yoke 18 unlocks, allowing piercing torsion rod 42 to pivot counterclockwise as seen from above Formation AA and allowing LTA 40 to safely escape. In reaction to the powerful change of motion exerted by the plurality of parachute 22, tow pipeline 14 and launch load 20 will swing about in a tightly constrained arc, velocity increasing more rapidly at points along tow pipeline 14 successively closer to fixed end cap 16. In effect, pivot yoke 18 has become a dynamic pivot point in the sky.

LTA 40 deployed its control surfaces for maximum counterclockwise turn with all of its engines at full power to start the spin cycle. LTA 40 departed as the plurality of parachute 22 on 18 directly behind it deployed. Piercing torsion rod 42 is intended to keep LTA 40 from being torn apart by the forces acting upon it during spinning and also to allow LTA 40 to bank steeply during the hard turn, which helps the pilots endure the high "g" force because they are then pressed down into their seats. Reference logic step 108 in FIG. 2D.

Tow trolley 26 have one degree of freedom to slide along tow pipeline 14 when internal brakes are released, but have two degrees of freedom in their own attachment to tow couplings 58. The plurality of sliding tow vehicle array 28 will be accelerating into and through the intended turn at full throttle, including afterburners, e.g. reheaters.

Since tow pipeline 14 will be posing a resistance to these motions and the consequent forces generated, the plurality of tow trolley 26 will react by starting to move along tow pipeline 14 in a direction away from fixed end cap 16 and towards pivot yoke 18, propelled by force applied by their respective sliding tow vehicle array 28. In equal and opposite reaction, the coiling tow pipeline 14 will feel forces from the plurality of tow trolley 26 that seek to straighten out tow pipeline 14 even as the flex mode continues. As the mass of the trolley moves, the system needs to conserve momentum.

During the flex and reflex process all the tow aircraft optimally will pull very heavy "g" forces, as will launch load 20. All vehicles must be engineered for this stress and all should be capable of flying unmanned or with unconscious humans aboard, depending on mission type. After rotations of from one degree to some multiple of 360 degrees and the final contraction of the radius of turn, the desired release point will be achieved and launch load 20 will separate from tow pipeline 14, launch load 20 thereafter proceeding along curve 74.

The twirling or spinning mentioned is merely the whole Formation AA circling in as compact a generally horizontal plane as it is jointly capable of doing given aerodynamic constraints and local conditions at a desired altitude of at least several miles above the surface of the Earth. The imperfect circles actually flown will likely be ellipsoidal in practice, which means that the velocity of the launch load will vary slightly along the ellipse.

In operation the takeoff and ascent portion of Formation AA's flight will be not unfamiliar to a person skilled in prior art that addresses either the tow or the ferry methods of transporting a space vehicle to launch altitude, including balloon methods. The centripetal reflex method of space launch differs in that a plurality of tow vehicles will impart to the space vehicle sufficient energy to achieve close to Mach 10 before the space vehicle's own rocket, scram-jet, or other type engine known to a person skilled in the art, becomes the sole source of propulsion. The engine of the space vehicle may be ignited before separation if it is deemed safe to do so and the liquid oxygen or other fuels they burn off during this period may be substantially replaced before the instant of separation.

Launch energy will be imparted via transfer of momentum due to the plurality of tow vehicles making a spiraling turn so compactly as to effectively make pivot yoke 18 resemble a stationary pivot point suspended in air. This imaginary pivot becomes a fulcrum upon which tow pipeline 14 will be bent. In reality, the whole system will be quite dynamic. The apparent circlings of launch load 20 and Formation AA while linked in an upward spiral will be imperfect ellipsoids and the accelerations at best closely approximate a smoothly continuous ideal.

Integral to the successful operation of the invention will be keeping a modicum of control over tow pipeline 14 during its flex and reflex phases. In essence, during the flex part of the maneuver the plurality of sliding tow vehicle array 28, and parachute 22 that deploys from the pivot yoke 18 are forcing the linear tow pipeline 14 back upon itself through a rotation of 60 degrees or more. During the flex phase much of the tremendous amount of kinetic energy being drained off from all the masses at/or near pivot yoke 18 on tow pipeline 14 as said masses slow during the final, abrupt turn will be in fact stored in tow pipeline 14 itself.

Note that although the powerful engines of the large transport aircraft 40 and its smaller escorts in tow vehicle array 34 had been trying to maintain a twirling speed of at least 450 mph during the increasingly tight turn, by time T=+25 while turning hard left at full throttle, they were fated to lose the battle. Soon, directly to the rear, the plurality of drogue parachute 22 on pivot yoke 18 deployed. The 450 mph forward velocity was instantly unmaintainable. In fact energy bled off so rapidly that even 150 mph, or close to the stall speed of LTA 40, became unmaintainable. Slightly before this point this point was reached, however, LTA 40 and its tow array 34 detached from socket 98 and left the formation for good. Pivot yoke 18 may swivel slightly to expedite this release, as the deployment of the plurality of parachute 22 may cause torsion rod 42 to bind up in in socket 98. Valves 170 in socket 98 at this point must seal the open ends of all transfer/storage pipes 37. Helium pressurant that has been stored inside one or several of the hollow honeycomb cell 46 at 400 psi will be injected into transfer/storage pipes 36 at socket 98.

The dramatic drop in forward velocity felt at pivot yoke 18 and the sections and structures of Formation AA closest to it represent momentum that will migrate outward to the end of tow pipeline 14 that is still free, causing cumulative but immense acceleration. Some of the missing momentum goes as kinetic energy, some will be stored as potential.

Some of the energy is lost to friction with the atmosphere, but much of the missing energy is being loaded into molecular tension within tow pipeline 14. Simultaneously with all these events, fixed CRW 30, its associated plurality of jet engine 108 with TVC, and the plurality of engine/turbocompressor set 38 on pivot yoke 18 will all be devoting full engine power with stored hydrogen peroxide assist to resist loss of altitude. The pivot end of the tow pipeline system is going to want to fall out of the sky. Fortunately, the irresistible acceleration due to gravity will not have many minutes to take effect before the launch is completed and recovery can begin, but pivot yoke 18 and nearby CRW trolleys 26 may sag several hundred meters on their end of tow pipeline 14 during this time.

At time T=+35, straightness being restored, launch load 20 now separates from coupling 150. Expulsion mode begins and ends in the same instant. Any rocket or scramjet engine (as known to a person skilled in the art) integral to launch load 20 may or may not already be ignited. After separation from launch load 20 is verified by systemwide controller and autopilot 100, tow pipeline 14 begins the whiplash recovery mode of the launch process. Whiplash recovery will be accomplished by a plurality of parachutes 82 which deploy on order from a plurality of drogue controller 88 in tow trolley 26 and parachute 94 which deploys on orders from drogue controller 96 in fixed end cap 16 at the instant separation of launch load 20 from tow pipeline 14 is verified.

It is anticipated that the parachutes will only be deployed for a handful of seconds before they are collapsed on order from systemwide controller and autopilot 100, which has a much more serious priority on hand than taming the whiplash.

Formation AA must be restored to flying orientation. Although close to it at the end, the plurality of tow formation 28 should never have actually gone into stall. If necessary the small aircraft can release slack from tow coupling and breakaway tether winch 58 so as to regain airspeed. Synthetic tow cable 24 also can be woven by a process known to a person skilled in the art so that cables can stretch up to three times their relaxed length under tension. In terrestial vehicles this ability allows a smaller tow vehicle to pull a larger one out of the mud by a running or "jerk" start, because the resilient tow lines smooth out the shock loading without diminishing the power benefit. The same can be done in the air, allowing the tow vehicles to regain airspeed before coming up against the full load. Any aircraft in a pushing arrangement on a boom can not do this, of course, and neither can large transport aircraft 40, which is solidly wedded to the tow pipeline.

As soon as whiplash recovery mode is verified by systemwide controller and autopilot 100 to be complete at time T=+50, the plurality of parachutes 22, 82, and 94 will deflate and be reeled in by methods familiar to a person skilled in the art. The plurality of tow trolley 26 will at this time assume stations along tow pipeline 14 that are appropriate to the new weight distribution and tow vehicle arrays 34 and 28 will re-attach. This last phase is not shown.

The plurality of tow trolley 26 may alter their positions as Formation AA makes further turns or prepares for landing. The lift requirement for tow pipeline 14 by this time should be satisfied by the rotor wings of the plurality of sliding CRW tow 26 trolley in unpowered autogyro rotation or in fixed wing mode. The bent rain-drop shape of tow pipeline 14 still provides some lift of its own. The pilot of tow pipeline 14 or systemwide controller and autopilot 100 (both in LTA 40 which is now at a distance and controlling by radio frequency transmission) can always selectively configure the differential of the upper and lower micro-hole laminar lift foil 50 so as to provide maximize lift at one end of tow pipeline 14 even as it maximizes speed at the other end. Internal baffles and gates, as known to a person skilled in the art, associated with laminar evacuated air channel 52 allow further selective maximization of the vacuum even within zones as small as a square decimeter or fore and aft on micro-hole laminar lift foil 50, as sensors detect areas of non-laminar flow.

Formation AA overall is in return mode by T=+55.

During the maximum strain of the flex phase, the plurality of powered CRWs integral to tow trolley 26 were really busy as they participated in the controlled slide of tow trolley 26 towards pivot yoke 18. As they moved, the plurality of rotors of tow trolley 26 (which at the time were in fixed wing mode) constantly assumed new oblique configurations to provide the optimal balance of sweep versus drag. The CRWs proper as known to a person skilled in the art also played a role in preventing tow pipeline 14 from twisting by means of their trim settings. They will have to do so as well on landing, because tow pipeline 14 uses a series of Boeing 777-type front landing gear as its retractable landing gear and brakes 104. Each landing gear truck therefore consists of only two tires. While these 777 tires are the largest in the industry, tow pipeline 14 is still going to resemble a hose trying to land on a series of unicycles.

Balance will count for everything. Balance will be maintained by the gyroscopic effect of the rotation of the ten conventional jet engines integral to tow pipeline 14, by TVC nozzles off of some of those engines, by the CRW's, and by computer-controlled application of the brakes of the plurality of landing gear and brakes 104 until ground vehicles arrive.

If any tow vehicle array 28 shall go into stall before they detach, they are at sufficient altitude to recover safely using well-tested techniques known to a person skilled in the art.

Perhaps the brunt of the lift requirements of tow pipeline 14 during most of the flight envelope, however, will always be met by tow pipeline 14 itself with the assistance of micro-hole laminar lift foil 50. Boundary air sucked through the micro-holes into laminar evacuated air channel 52, as all known to a person skilled in the art, enables smooth laminar flow all around the wing. This smooth flow can increase the absolute velocity of the wing (tow pipeline 14) through the air.

A portion of the vacuum which inhales outside air into laminar evacuated air channel 52 is created by jet engine/turbocompressor set 38 at fixed end cap 16 and pivot yoke 18, reference FIG. 3. Jet engine set 108 on tow trolley 26 also cause air to be sucked into laminar evacuated air channel 52, but then jet engine set 108 sucks said air right out again, expelling it eventually through the CRW tips. A highly unusual aspect of this embodiment is the stipulation of micro-hole laminar lift foil 50 on the bottom of the wing. Such a system for enhancing laminar flow as known to a person skilled in the art will be important if the portions of rain-drop shaped tow pipeline 14 closest to launch load 20 are to have any hope of reaching Mach 10 or better during the reflex phase. The necessary features that the centripetal reflex method of space launch brings to the operation, however, are three ways of continuously cleaning the micro-holes of laminar lift panel 20 while in flight.

It is known to a person skilled in the art that very high pressure nitrogen gas directed in a precise manner by devices such as high pressure precision gas cleaning nozzle 162, located on a plurality of traveling cleaning head 64, Reference FIG. 11, can be used to do very fine cleaning assignments, such as of laser-cut micro-holes. The problem in an airplane is to have a continuous supply of nitrogen gas so that the cleaning process can be continuous on a high-coverage basis as a plurality of traveling cleaning heads 64 move busily inside tow pipeline 14, sometimes tracking underneath a plurality of tow trolley 26, most of the time not. The manufacture of abundant supplies of nitrogen gas in mechanism for making liquid oxygen in flight 60 and means to deliver that nitrogen gas to a plurality of traveling cleaning heads 64 having been provided, cleaning of the micro-holes should be sufficient when combined with the "reverse flow" effect that the air intakes of jet engine set 108 on tow trolley 26 possess. The supplemental heating red laser (included in the plurality of traveling cleaning heads 64) 160's cleaning ability regarding ice and moisture, combined with standard moisture traps in the ducts, will, with all the foregoing, each severally and together advance and achieve all the aims of the present invention.

Note that first the nitrogen gas will be periodically uploaded to the plurality of traveling cleaning heads 64. During the cleaning process the nitrogen gas will be squirted upward through the micro-hole laminar lift foil 50 and into jet engine set 108 from whence it will eventually be expelled into the atmosphere through the rotor wing tips. All debris loosed from the micro-holes are thereby evacuated and expunged in the nitrogen flow. Debris loosened by heating red laser 160 will follow the same path.

Liquid oxygen continually being manufactured in LTA 40 continues flowing through tow pipeline 14 during the flex phase. As the radius of turn decreases the velocities of all components of Formation AA will be in flux, but when the point is reached where Formation AA is no longer aerodynamically capable of decreasing its radius of turn without proceeding to reflex phase, the angular velocities of all components will be relatively stable.

As the reflex phase commences, large transport aircraft 40 at the pivot end will be struggling to maintain 150 mph and launch load 20 should be near Mach 1.5. Elements of Formation AA between those two extremes will be at intermediate velocities. Certain of the sliding tow vehicle array 28 may be in excess of Mach 1, but if any of the aircraft of the array can't make it and are in danger of being run over by tow pipeline 14, the remedy for this array is to slide to their left by directing their corresponding tow trolley 26 to slide left towards pivot yoke 18. This movement of sliding tow vehicle array 28 should be continuously imparting energy to tow pipeline 14 throughout the motion, for the reason that all the vehicles in sliding tow vehicle array 28 are straining to turn to the right of the illustration (their left) with all the power of their TVC equipped engines and ample control surfaces.

The plurality of tow trolley 26, with their teamed sliding tow vehicle array 28, when they are done participating in the slide to the right (their left) along tow pipeline 14, have their slides moderated and finally terminated by on-board trolley wheels and brakes 130, reference FIG. 9A. In all a total of a little over 300,000 kgs of mass has slid inward. Now picture how visibly the spin velocity of an ice skater increases as she brings her arms in while spinning on one skate tip. This system has just drawn in two-thirds of a million pounds about a full kilometer closer to the axis of rotation, and the launch load weighs only 11,000 lbs.

Note that Formation AA may switch modes from reflex to expulsion mode under direction of the human pilot or system-wide controller and autopilot 100.

Inside large transport aircraft 40, the frame of mechanism for making liquid oxygen in flight 60 physically supports piercing torsion tow rod 42 which extends from pivot yoke 18 through large transport aircraft 40 from tail to nose along the cargo deck and out the nose to attach to tow lines 18, which in turn attaches to tow vehicle array 34. Torsion tow rod 42 resembles tow pipeline 14 in that it is stiff but it will deflect. In so doing torsion rod 42 is also an energy storage device. Modifications to the fuselage fore and aft of large transport aircraft 40 so that piercing torsion rod 42 can pass through it must take into account maintaining some level of cargo area pressurization assuming a deflection of no more than 20 centimeters.

Addressing another safety issue now, picture the plurality of parachute 22 when anchoring pivot yoke 18 in the air actually bending this end of tow pipeline 14 so far back that it comes near the end supporting launch load 20, which is lagging for reasons of its own.

If, in fact, tow pipeline 14 bends through more than 180 degrees, care will have to be taken to avoid objects at its opposite ends meeting in collision.

Yet another safety advantage can be obtained by using the nitrogen gas that is a by-product of the manufacture of liquid oxygen in large transport aircraft 40 as an inert fire suppressant in reachable fuel tanks and other empty spaces such as transfer/storage pipe 36 as they empty, a procedure that is known to a person skilled in the art.

The net effect of the extreme flex of tow pipeline 14 and other procedures will be that the velocity experienced at fixed end cap 16 by launch load 20 will be the summation of: a) its hypersonic initial velocity at time T=+10, b) reflex velocity due to cumulatively stored potential energy in tow pipeline 14 being unleashed in the form of motion, c) velocity due to the sheer leveraged power of the engines of the plurality of sliding tow vehicle array 28 as they increase the arm of their lever by moving away from fixed end cap 16, d) velocity due to the thrust of jet engine/turbocompressor set 38, and e) all velocity contributed by rocket or ramjet engines integral to the rocketplane that have been replacing rocket fuel and oxidizer as they consume it. The total of these five different sums is velocity 54 which will be expressed along launch trajectory 74.

Note that at approximate time T=+20 of the expulsion mode, tow pipeline 14 for a fraction of an instant achieves straightness in a vertical plane as viewed from above. As close to this time as possible, systemwide controller and autopilot 100 commands latching mechanism for launch load 150 to release launch load 20.

At approximate time T=+21 (not shown) Formation AA has switched to whiplash recovery mode as directed by systemwide controller and autopilot 100. Drogue controller 78 may or may not continue to deploy drogue parachute 22 on 18, and a plurality of drogue controller 88 will deploy parachutes 82, which are contained within tow trolley 26 respectively. Drogue controller 96 deploys parachute 94, which is contained within fixed end cap 16.

At approximate time T=+40 whiplash recovery verification is proved and Formation AA is ready to return to base. Proving recovery involves more than an end to the oscillations, but also a thorough inspection by outrigger video cameras 172 of everything in Formation AA. Pilots in all tow vehicles can also inspect each other's aircraft and the rest of Formation AA directly.

If all of the aircraft tow vehicles are forced to completely detach for safety reasons, even severing the very thin emergency tethers, methods known to a person skilled in the art may still recover tow pipeline 14 as it descends by parachute.

Either the original tow aircraft or others may attempt to snag the descending tow pipeline 14 and return it to base, using techniques familiar to persons skilled in the art from decades of aerospace experience in recovering satellites returning from space during the stage where they descend by parachute, or if detachment was not total, the original tow aircraft may reel in the emergency tethers with winches provided in couplings 58 by techniques known to a person skilled in the art. These winches may also increase or decrease the length of synthetic blend tow lines 24 as desired during towing.

The necessary LTA 40 in the present embodiment will possess the conventional attributes of a fan-jet powered heavy-lifter cargo aircraft such as the Antonov An-225 or a cargo version of the Airbus A-380. In later embodiments LTA 40 may instead be a designed-to-purpose very large transport aircraft with more than a half-million ft-lbs of thrust available from its onboard engine and a means of diverting thrust from those engine so as to enable the aircraft to make tight turns at high altitude without requiring the assistance of either drogue parachutes or an array of more nimble aircraft to pull its nose around.

Control system elements in the LTA 40, required a) for the operation of Formation AA, including all elements of tow pipeline 14 b) for coordinating the cooperating arrays of smaller tow vehicles and other cooperating control systems such as for braking and parachutes c) for controlling the ascent and launching of the towed space vehicle should all fit in a plurality of typical aeronautical computers available from many vendors, using programs known to a person skilled in the art and generally available in the marketplace. Piasecki Aircraft Corporation of Essington, Pa., would be the preferred company to integrate the control system elements together and install them, mainly due to their demonstrated willingness to think outside the box.

After separation, Formation AA may return to base to hook up again for multiple orbital insertions in one day, or may disassemble so that some of its parts can proceed to another assignment. The turn-around time between launches should be little more than typically required for fueling and routine service checks. Parachutes will need to be inspected and repacked or replaced. Tow pipeline 14 will require a skilled service check crew to walk its length and check visually and instrumentally for cracks. Before LTA 40 is re-attached to tow pipeline 14, all transfer/storage pipe 36 must be scoped their entire length with internal snaking video probes, a process known to a person skilled in the art; actually known in many arts, from medicine, to residential plumbing, to nuclear plant safety inspections of stainless steel piping. The present inspection should be similar in thoroughness to the latter.

DESCRIPTION—ALTERNATIVE
EMBODIMENT—FIGS. 12A and 12B

It may immediately be appreciated that this embodiment is much simpler in appearance than the embodiment that is preferred. The preference chiefly arises because aircraft in the preferred embodiment already exist that could fill the assigned roles more than adequately. Gone are all the tow lines and tow arrays in this alternative embodiment. In their place is one or more of a fantasy airplane that has the appearance of a blended wing body, but with more prominent vertical stabilizers than blended wing body purists would like to see. It should also have four or more of the GE 90-115C series engines or an equivalent, which currently can supply about 125,000 hp each at 400 mph. So equipped, the four LTA 40 shown would have around two million horsepower available to carry out the centripetal reflex method of space launch. More LTA would support a longer tow pipeline 14.

The reader should also note that the estimated length dimension of tow pipeline 14 has also changed. It is now 20 kilometers! It may well turn out that tow pipeline 14 does not need to look like a fat rain-drop. It may well look more like a very long helicopter rotor blade. The perforated micro-hole laminar lift system would remain on the top and the bottom of the wing. Also, the plurality of CRW tow trolley 26 would remain to perform their essential functions of providing a plurality of sliding tow attachment points for the new plurality of LTA 40, of hosting a plurality of jet engine set 108, reference FIG. 9B, which in turn will continue to provide vacuum for the plurality of laminar evacuated air channel 52, reference FIG. 10. Also present is the internal micro-hole cleaning system.

Perhaps the real upper limiting factor to the length of tow pipeline 14 will be finding a place suitable for it to take off. Utah's Bonneville salt flats seem a likely candidate. On the other hand, tow pipeline 14 might be reduced in length to as little as a few hundred meters, especially for proof-of-concept demonstrations.

The critical factors regarding LTA 40 itself will be whether a built-to-purpose aircraft will have sufficient size, power, airframe ruggedness, and thrust vectored control (diverted thrust) on all its engines. The characteristics that would make such a large new aircraft ideal for the centripetal reflex method of space launch would also make said aircraft extraordinarily good at STOL, even VSTOL flight, or at flying surface effect.

Especially intriguing would be variants of blended wing body designs with the lower fuselage configured as a catamaran seaplane hull. This would enhance the utility of the novel aircraft in a much-broader range of special applications.

What is claimed is:

1. A method of transport to earth orbit and interplanetary space utilizing at least one in-flight refueling boom-pipe/tow structure which extends laterally from connection with at least one fuel tanker aircraft having a means of propulsion out to a releasable connection with at least one space launch vehicle; comprising the steps of:
    a) pulling said boom-pipe/tow structure to an altitude suitable for the launching operation by means of the propulsion systems of said fuel tanker aircraft and a plurality of other tow aircraft, each having a means of propulsion;
    b) fashioning said boom pipe/tow structure in a manner that said boom pipe/tow structure itself will supply some of the aerodynamic lift and propulsion necessary to ascend and remain at altitude sufficient for launch operations of the space vehicle;
    c) providing said fuel tanker aircraft with a plurality of tank capable of simultaneously carrying various fuels for propulsion and dispensing such fuels through suitable devices without cross contamination as known to a person skilled in the art;
    d) manufacturing some fuels in-flight within said fuel tanker aircraft by means of devices as known to a person skilled in the art;
    e) attaching said plurality of other tow aircraft through suitable tow lines to at least one tow trolley which possesses one degree of freedom to move along the said
    f) boom-pipe/tow structure, said tow trolley having at least one device as known to a person skilled in the art for creating aerodynamic lift in a manner that assists in control of the boom-pipe/tow structure and said tow trolley having at least one device for propulsion; and
    g) the step of reaching an altitude and positioning suitable for the launch operation, said launch operation consisting of the principle known to a person skilled in the art by which a spinning tether may accelerate a load, in the present invention said space vehicle, comprising the steps of:
    (I) spinning said boom-pipe/tow structure to accelerate said load;
    (II) turning at least one said other tow aircraft in the direction that said fuel tanker aircraft is turning to cause said tow trolley to move in said direction;
    (III) moving said tow trolley laterally towards initial said fuel tanker aircraft to accelerate said load;
    (IV) firing of all rocket motors that are not already providing thrust to accelerate said load;
    (V) running all air breathing engines integral to one or more devices used in said method to accelerate said load;
    (VI) deploying at least one parachute directly behind at least one attachment point of the boom-pipe/tow structure to said fuel tanker airplane to accelerate said load;
    (VII) reflexing of the boom-pipe/tow structure from a condition of being flexed by the deployment of said parachute to accelerate said load;
    (VIII) launching of said space vehicle by means of at least one suitable release mechanism to separate at least one connection between said boom-pipe/tow structure and said space vehicle at the desired release point;
    (IX) recoiling of said boom pipe/tow line to be brought back under control by the deployment of an additional plurality of parachute as known to a person skilled in the art and by moving said tow trolley laterally away from said fuel tanker;
    (X) recovering from aerodynamic stall and repositioning of said fuel tanker aircraft, at least one tow trolley, and at least one additional tow aircraft; and
    (XI) flying after sufficient control is regained over the combined system of said devices with airplane-like functionality and utility to a suitable surface of the Earth for landing.

2. The method recited in claim 1 wherein said boom-pipe/tow structure in itself contains all necessary propulsion systems.

3. The method recited in claim 1 wherein said boom-pipe/tow structure in itself contains all necessary fuel storage tanks.

4. The method recited in claim 1 wherein said boom-pipe/tow structure in itself contains all necessary devices for creating fuel in-flight.

5. The method recited in claim 1 wherein said boom-pipe/tow structure in itself contains all necessary devices for control and positioning.

6. The method recited in claim 1 wherein at least one said parachute is supplemented by a reverse engine thrust aerial braking system and the suitable positioning of airfoil effectors.

* * * * *